US011521202B2

(12) United States Patent
Coleman et al.

(10) Patent No.: US 11,521,202 B2
(45) Date of Patent: Dec. 6, 2022

(54) DISTRIBUTED COMPUTING AND STORAGE NETWORK IMPLEMENTING HIGH INTEGRITY, HIGH BANDWIDTH, LOW LATENCY, SECURE PROCESSING

(71) Applicant: International Business Machines Corporation, Armonk, NY (US)

(72) Inventors: Andrew J. Coleman, Hursley (GB); Anthony J. O'Dowd, Hursley (GB)

(73) Assignee: International Business Machines Corporation, Armonk, NY (US)

(*) Notice: Subject to any disclaimer, the term of this patent is extended or adjusted under 35 U.S.C. 154(b) by 373 days.

(21) Appl. No.: 16/116,988

(22) Filed: Aug. 30, 2018

(65) Prior Publication Data

US 2020/0074456 A1 Mar. 5, 2020

(51) Int. Cl.
*G06Q 20/38* (2012.01)
*G06Q 20/40* (2012.01)

(52) U.S. Cl.
CPC ......... *G06Q 20/382* (2013.01); *G06Q 20/401* (2013.01)

(58) Field of Classification Search
CPC ............... G06Q 20/382; G06Q 20/401; G06Q 2220/00; G06Q 20/3829; G06Q 20/02
See application file for complete search history.

(56) References Cited

U.S. PATENT DOCUMENTS

| | | | |
|---|---|---|---|
| 2014/0283109 A1 | 9/2014 | Quong | |
| 2015/0248525 A1 | 9/2015 | Ury et al. | |
| 2015/0332395 A1* | 11/2015 | Walker | G06Q 20/065 |
| | | | 705/69 |
| 2017/0236123 A1 | 8/2017 | Ali et al. | |
| 2017/0359440 A1 | 12/2017 | Hass et al. | |
| 2018/0005186 A1* | 1/2018 | Hunn | G06F 16/93 |
| 2018/0025442 A1* | 1/2018 | Isaacson | G06F 3/048 |
| | | | 705/26.62 |
| 2018/0219671 A1 | 8/2018 | Velissarios et al. | |
| 2018/0315141 A1 | 11/2018 | Hunn et al. | |
| 2018/0336515 A1* | 11/2018 | Mehring | H04L 9/0637 |

(Continued)

FOREIGN PATENT DOCUMENTS

CN 107635028 B 7/2020

OTHER PUBLICATIONS

List of IBM Patents or Patent Applications Treated as Related, todays date.

(Continued)

*Primary Examiner* — Patrick McAtee
*Assistant Examiner* — Vincent I Idiake

(57) ABSTRACT

An example operation may include one or more of constructing a transaction proposal and sending the constructed transaction proposal to a plurality of endorsing nodes, by a client application of a computing system, wherein inputs to the transaction proposal are named using a blockchain naming system (BNS), receiving a set of transaction responses from the plurality of endorsing nodes, by the client application of the computing system, the transaction responses each comprising a transaction validation function, assembling the received transaction responses into a transaction, by the client application of the computing system, and sending the transaction to an orderer node for distribution, by the client application of the computing system.

6 Claims, 25 Drawing Sheets

(56) References Cited

U.S. PATENT DOCUMENTS

| | | |
|---|---|---|
| 2019/0058910 A1 | 2/2019 | Solow |
| 2019/0158275 A1* | 5/2019 | Beck ........................ H04L 63/20 |
| 2019/0215159 A1* | 7/2019 | Notani .................. H04L 9/3239 |
| 2019/0347658 A1* | 11/2019 | Haimes .................. G06Q 40/02 |
| 2019/0377617 A1 | 12/2019 | Jacobs et al. |
| 2020/0034395 A1 | 1/2020 | Lu |
| 2020/0175623 A1* | 6/2020 | Howie .................. G06Q 20/389 |
| 2020/0374113 A1 | 11/2020 | Noam et al. |

OTHER PUBLICATIONS

X. Coleman, "Distributed Computing and Storage Network Implementing High Integrity, High Bandwidth, Low Latency, Secure Processing", U.S. Appl. No. 16/116,992, filed Aug. 30, 2018 (a copy is not provided as this application is available to the Examiner).
Thaler et al., Guidelines and Registration Procedure for URI Schemes, Jun. 2015.

* cited by examiner

200

```
@contract public : Fuel ( transaction ) :

buyer = transaction.proposal.buyer              // Daisy
seller = transaction.proposal.seller            // gas station branch
network = transaction.proposal.cardType         // card company
instruction = transaction.proposal.instruction  // buyFuel
response = instruction ( buyer, seller, network )  // response return response
```

```
private : buyFuel ( buyer, seller, network ) :

if buyer == /Daisy then discount = 5%           // BNS named resource
price = /fuel.price.now – discount              // BNS oracle price return transferPayment ( price, buyer.account, seller.acccount)
```

```
public : transferPayment ( amount, fromAccount, toAccount, network ) :
        @endorsedBy (buyer.bank, seller.bank, network)

fromAcount = fromAccount - amount
toAccount = toAccount + amount
```

| Application | Smart Contract | Application | Ordering Service | Ledger |
|---|---|---|---|---|
| Propose 410 | Execute 420 | Assemble 430 | Order 440 | Commit 450 |
| Application creates a signed transaction proposal | A private smart contract (chaincode) uses the transaction proposal to generate a transaction response. | Application constructs transaction comprising proposal, response & endorsements: | Transactions from different applications are ordered into blocks | Generate ledger update as W-set using validation function |
| The proposal contains the transaction input variables for a smart contract function. Transaction inputs are named using a naming system | The response is described as a public validation function. Later, it will calculate any updates to ledger world state. (RW-set not generated now) | • Single Proposal | Blocks are optimized for parallel processing, using streams and sequences | Transaction valid |
| Proposal individually sent to all organizations chaincode. (As defined by endorsement policy) | Return validation function, as signed transaction response, to application. | • Single response (note: multiple generated) | Blocks are cryptographically hashed and linked to each other | • if W-set not nil |
| Waits for all necessary responses | | • Multiple endorsements (from each organization) | | • if transaction is endorsed by necessary organizations |
| | | Submit transaction to ledger, via ordering service | | Add all transactions to blockchain (valid & invalid) |
| | | | | Update ledger with W-set |
| | | | | Notify application of ledger update |

DISTRIBUTED COMPUTING AND STORAGE NETWORK IMPLEMENTING HIGH INTEGRITY, HIGH BANDWIDTH, LOW LATENCY, SECURE PROCESSING

This application generally relates to distributed computing and storage networks, and more specifically, to a distributed computing and storage network implementing high integrity, high bandwidth, low latency, secure processing.

BACKGROUND

Distributed computing and storage networks that store information on one or more databases, for instance, may operate to collectively carry out various network operations. Such networks may facilitate secure communications and may provide secure blockchain transactions, for instance. A blockchain is typically a distributed network of computing systems (i.e., nodes). Each node hosts a copy of a ledger, and each node has an owning organization. Multiple transactions can be submitted at different points in the network at the same time. However, each node must record a mutually agreed sequence of the transaction order on its copy of the ledger.

At least the following problems are associated with conventional processing of blockchain smart contracts today. Transactions only record state transitions, and not transaction logic. A transaction is captured as a read-write (RW) set on a state store (e.g., one or more databases). Each database may store and maintain data in one or more individual database servers, for example. Such servers may be desktop computers, rack servers, mainframe computers, etc. Information stored on a database is typically accessible from multiple different points. Multiple users or client workstations can work simultaneously on the database(s), for example, based on a client/server configuration. Within each database, data redundancy may be minimized as a single storing place of all data also implies that a given set of data only has one primary record. However, data redundancy may be governed by various RAID configurations, for example.

Conventionally, the transaction semantics are immediately lost, which could cause problems for subsequent audit requirements or for replay of transactions as part of a disaster recovery scenario. For example, a transaction recording the purchase of an item might only record the customer's new bank balance or the supplier's stock level in the RW-set, and not the publicly relevant details of why the bank balance was changed or why the stock level changed, for instance (e.g., if the stock level was reduced as the result of a sale or an audit). In other words, the history is limited to facts and not reasons.

At the same time, it must be possible to maintain a private context for transactions—not all parts of a transaction are public or private. For instance, a smart contract may grant a certain individual a 5% discount, but none of this private transaction context should be recorded. It is necessary, however, to record public aspects of this transaction as to why the transaction is performed (e.g., bank balances have been debited or credited).

Also, large transactions cost bandwidth and latency. If a transaction causes widespread updates to data in the state store, then the RW-set could be potentially very large. Since this RW-set is transferred around the blockchain network (which itself could include many widely distributed peers), conventionally, the bandwidth and latency implications lead to a costly and poor performing system. This is because a transactions ship data that has to be generated, moved around the network, MVCC-checked, and then finally applied.

Furthermore, overlapping state changes waste good transactions. A weakness of conventional blockchain processing systems is that all endorsing peers across the network must achieve consensus on an identical RW-set before it can be committed to the ledger. During that potentially long period, another transaction might be invoked that affects overlapping parts of that RW-set. That new transaction will always fail consensus as a result, and will fail purely because of latency in the network.

Accordingly, an improved distributed computing and storage network and process that overcomes one, some, or all of these deficiencies may be beneficial.

SUMMARY

One example embodiment provides a system that includes at least one processor and memory storing computer program instructions that include a smart contract accessible by the at least one processor. The computer program instructions are configured to cause the at least one processor to perform one or more of receive a transaction proposal from a client application of an external computing system, based on the received transaction proposal and a current version of a ledger, generate a validation function, create a transaction response comprising the validation function, and send the transaction response comprising the validation function to the client application of the external computing system.

One example embodiment provides a system that includes at least one processor and memory storing computer program instructions that include a smart contract accessible by the at least one processor. The computer program instructions are configured to cause the at least one processor to perform one or more of construct a transaction proposal, wherein inputs to the transaction proposal are named based on a blockchain naming system (BNS) that comprises ledger state addressing, oracles for addressing external data values, and user state addressing, the BNS provides a standard mechanism to name all blockchain resources based on a universal resource indicator (URI), send the constructed transaction proposal to a plurality of endorsing nodes.

Another example embodiment may provide a method that includes one or more of constructing a transaction proposal and sending the constructed transaction proposal to a plurality of endorsing nodes, by a client application of a computing system, wherein inputs to the transaction proposal are named using a blockchain naming system (BNS), receiving a set of transaction responses from the plurality of endorsing nodes, by the client application of the computing system, the transaction responses each comprising a transaction validation function, assembling the received transaction responses into a transaction, by the client application of the computing system, and sending the transaction to an orderer node for distribution, by the client application of the computing system.

Another example embodiment may provide a method that includes one or more of constructing a transaction proposal, by a computing system, wherein inputs to the transaction proposal are named using a blockchain naming system (BNS) that comprises ledger state addressing, oracles for addressing external data values, and user state addressing, the BNS providing a standard mechanism to name all blockchain resources using a universal resource indicator (URI).

A further example embodiment provides a computer program embodied on a non-transitory computer-readable medium. The program is configured to cause at least one processor to perform one or more of receive a transaction that is packaged into blocks from an orderer node, unpack the received transaction from the blocks, and use a validation function to update a ledger.

A further example embodiment provides a computer program embodied on a non-transitory computer-readable medium. The program is configured to cause at least one processor to perform one or more of receive transactions for distribution, use a blockchain naming system (BNS) to analyze and optimize packaging and ordering of blocks based on the transactions, wherein blocks are ordered such that streams can be executed in parallel while sequences are executed in order, facilitating parallelization, and send the ordered blocks to nodes of a blockchain network for validation.

BRIEF DESCRIPTION OF THE DRAWINGS

FIG. 2 illustrates example functional transaction (FT) functions, according to example embodiments.

FIG. 3A is a screenshot illustrating example function code for generating closure, according to example embodiments.

FIG. 4 illustrates a five-step process for how the fabric commits transactions, according to example embodiments.

DETAILED DESCRIPTION

Figure 1:
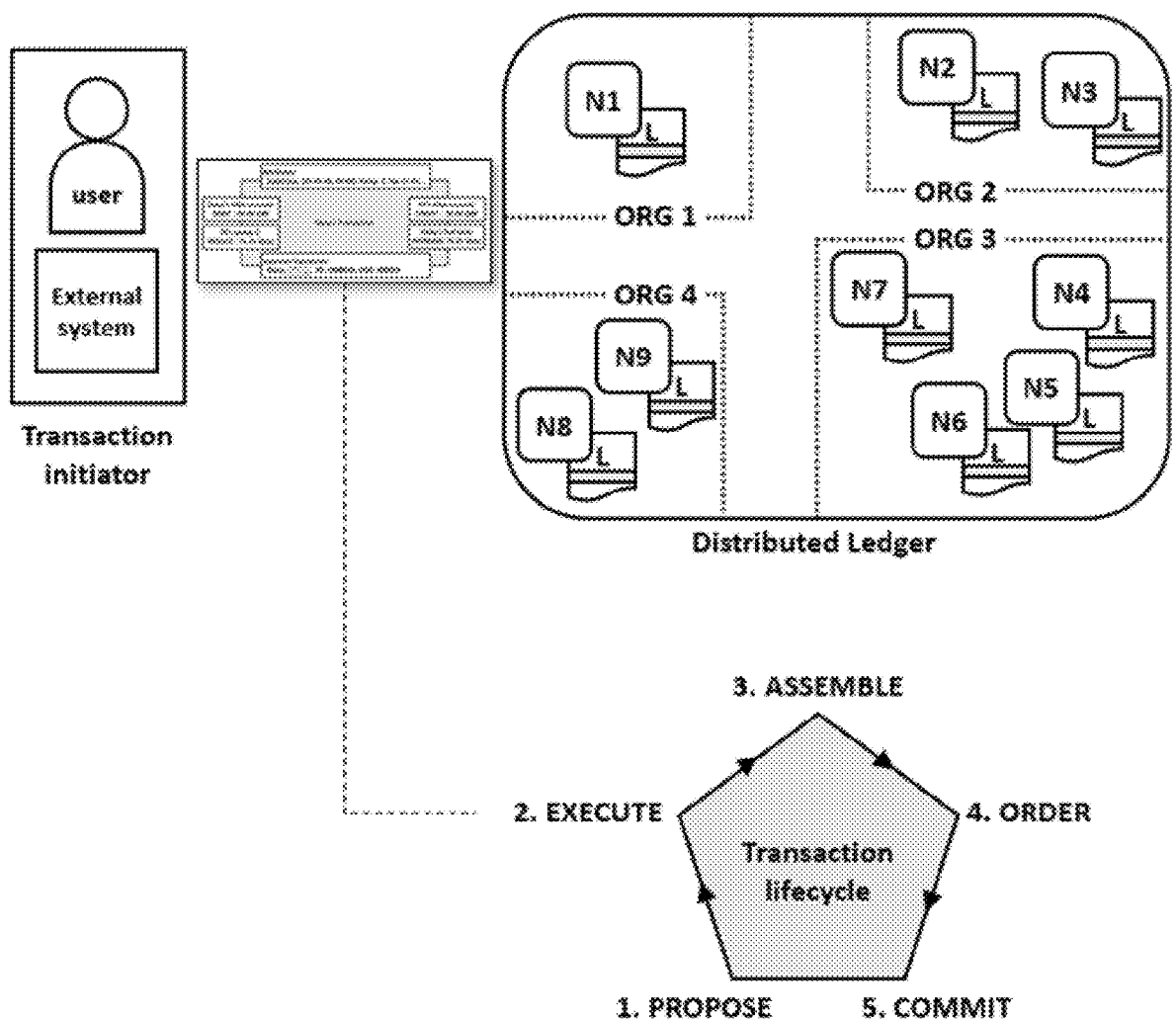
FIG. 1 illustrates a transaction lifecycle of a distributed ledger transaction, according to example embodiments.

It will be readily understood that the instant components, as generally described and illustrated in the figures herein, may be arranged and designed in a wide variety of different configurations. Thus, the following detailed description of the embodiments of at least one of a method, apparatus, non-transitory computer readable medium and system, as represented in the attached figures, is not intended to limit the scope of the application as claimed but is merely representative of selected embodiments.

The instant features, structures, or characteristics as described throughout this specification may be combined in any suitable manner in one or more embodiments. For example, the usage of the phrases "example embodiments", "some embodiments", or other similar language, throughout this specification refers to the fact that a particular feature, structure, or characteristic described in connection with the embodiment may be included in at least one embodiment. Thus, appearances of the phrases "example embodiments", "in some embodiments", "in other embodiments", or other similar language, throughout this specification do not necessarily all refer to the same group of embodiments, and the described features, structures, or characteristics may be combined in any suitable manner in one or more embodiments.

In addition, while the term "message" may have been used in the description of embodiments, the application may be applied to many types of network data, such as, packet, frame, datagram, etc. The term "message" also includes packet, frame, datagram, and any equivalents thereof. Furthermore, while certain types of messages and signaling may be depicted in exemplary embodiments they are not limited to a certain type of message, and the application is not limited to a certain type of signaling.

Example embodiments provide methods, systems, components, non-transitory computer readable media, devices, and/or networks, that provide a distributed computing and storage network employing a blockchain naming system (BNS) and functional transactions (FTs). The BNS provides unambiguous naming of all data relevant to the blockchain system and including ledger state addressing, oracles for addressing external data values, user state addressing, clear resource structure, allows architects and software engineers to model real world relationships, allows blockchain information to be analyzed and optimized, or any combination thereof. The system uses FTs instead of conventional blockchain transactions in order to process transactions more effectively than conventional blockchain techniques.

A decentralized database is a distributed storage system that includes multiple nodes that communicate with each other. A blockchain is an example of a decentralized database that includes an append-only immutable data structure resembling a distributed ledger capable of maintaining records between mutually untrusted parties. The untrusted parties are referred to herein as "peers" or "peer nodes." Each peer maintains a copy of the database records, and no single peer can modify the database records without a consensus being reached among the distributed peers. For example, the peers may execute a consensus protocol to validate blockchain storage transactions (which may be functional transactions in some embodiments), group the storage transactions into blocks, and build a hash chain over the blocks. This process forms the ledger by ordering the storage transactions, as is necessary, for consistency. In a public or permission-less blockchain, anyone can participate without a specific identity. Public blockchains often involve native cryptocurrency and use consensus based on various protocols such as Proof of Work (PoW). On the other hand, a permissioned blockchain database provides a system which can secure inter-actions among a group of entities which share a common goal but which do not fully trust one another, such as businesses that exchange funds, goods, information, and the like.

A blockchain operates arbitrary, programmable logic, tailored to a decentralized storage scheme and referred to as "smart contracts" or "chaincodes." In some cases, specialized chaincodes may exist for management functions and parameters which are referred to as system chaincode. Smart contracts are trusted distributed applications which leverage tamper-proof properties of the blockchain database and an underlying agreement between nodes which is referred to as an endorsement or endorsement policy. In general, blockchain transactions (e.g., functional transactions) typically must be "endorsed" before being committed to the blockchain while transactions which are not endorsed are disregarded. A typical endorsement policy allows chaincode to specify endorsers for a transaction in the form of a set of peer nodes that are necessary for endorsement. When a client sends the transaction to the peers specified in the endorsement policy, the transaction is executed to validate the transaction. After validation, the transactions enter an ordering phase in which a consensus protocol is used to produce an ordered sequence of endorsed transactions grouped into blocks.

Nodes are the communication entities of the blockchain system. A "node" may perform a logical function in the sense that multiple nodes of different types can run on the same physical server. Nodes are grouped in trust domains and are associated with logical entities that control them in various ways. Nodes may include different types, such as a client or submitting-client node which submits a transaction-invocation to an endorser (e.g., peer), and broadcasts trans-action-proposals to an ordering service (e.g., ordering node). Another type of node is a peer node which can receive client submitted transactions, commit the transactions and maintain a state and a copy of the ledger of blockchain transactions. Peers can also have the role of an endorser, although it is not a requirement. An ordering-service-node, or orderer, is a node running the communication service for all nodes, and which implements a delivery guarantee, such as a broadcast to each of the peer nodes in the system when committing transactions and modifying a world state of the blockchain, which is another name for the initial blockchain transaction which normally includes control and setup information.

A ledger is a sequenced, tamper-resistant record of all state transitions of a blockchain. State transitions may result from chaincode invocations (i.e., transactions) submitted by participating parties (e.g., client nodes, ordering nodes, endorser nodes, peer nodes, etc.). A transaction may result in a set of asset key-value pairs being committed to the ledger as one or more operands, such as creates, updates, deletes, and the like. The ledger includes a blockchain (also referred to as a chain) which is used to store an immutable, sequenced record in blocks. The ledger also includes a state database which maintains a current state of the blockchain. There is typically one logical ledger per channel. Each peer node maintains a copy of the ledger for each channel of which they are a member.

A chain is a transaction log which is structured as hash-linked blocks, and each block contains a sequence of N transactions, where N is equal to or greater than one. The block header includes a hash of the block's transactions, as well as a hash of the prior block's header. In this way, all transactions on the ledger may be sequenced and crypto-graphically linked together. Accordingly, it is not possible to tamper with the ledger data without breaking the hash links. A hash of a most recently added blockchain block represents every transaction on the chain that has come before it, making it possible to ensure that all peer nodes are in a consistent and trusted state. The chain may be stored on a peer node file system (i.e., local, attached storage, cloud, etc.), efficiently supporting the append-only nature of the blockchain workload.

The current state of the immutable ledger represents the latest values for all keys that are included in the chain transaction log. Because the current state represents the latest key values known to a channel, it is sometimes referred to as a world state. Chaincode invocations execute transactions against the current state data of the ledger. To make these chaincode interactions efficient, the latest values of the keys may be stored in a state database. The state database may be simply an indexed view into the chain's transaction log. The state database can therefore be regenerated from the chain at any time. The state database may automatically be recovered (or generated, if needed) upon peer node startup, and before transactions are accepted.

Some embodiments of the present application are directed to a distributed computing and storage network employing a BNS that provides unambiguous naming of all data relevant to the blockchain system, and includes ledger state addressing, oracles for addressing external data values, user state addressing, clear resource structure, allows architects and software engineers to model real world relationships, allows blockchain information to be analyzed and optimized, or any combination thereof. The distributed computing and storage network may also utilize FTs.

Some advantages of some embodiments of the present application over, and novel distinctions from, conventional systems and processes include at least the following. Some embodiments solve the limitations arising from only recording state transitions in transactions by representing a transaction as a function that generates a function closure instead of a RW-set. This function closure may encode the semantics of the transaction and may only be invoked at the last stage of processing when committing to the ledger. Some embodiments solve the high bandwidth and latency costs of large transactions by distributing a function closure that encapsulates the transaction logic. As well as being smaller, a pure function (i.e., one that has no side effects and no shared state) is readily able to be invoked in parallel with other functions without the "race conditions" associated with non-functional programs. Some embodiments solve wasting of good transactions during overlapping state changes by not relying on a "frozen state" for the duration of the consensus process. Instead, the peers agree consensus on the function closure, which is deterministic and independent of the current state.

A blockchain is different from a traditional centralized database in that a blockchain is not a central storage. Rather, a blockchain is a decentralized, immutable, and secure storage, where nodes must share in changes to records in the storage. Some properties that are inherent in a blockchain and that help implement the blockchain include, but are not limited to, an immutable ledger, smart contracts, security, privacy, decentralization, consensus, endorsement, accessibility, and the like, which are further described herein. According to various aspects, the advantages discussed above are implemented due to blockchain-specific transaction processing that focuses on function closure. This is a fundamentally different approach to, and a novel approach over, the RW-set functionality of conventional approaches.

One of the benefits of some embodiments is that they may improve the functionality of a computing system and/or a network of computing systems by focusing on function closures rather than RW-sets. Through the blockchain system described herein, a computing system can perform this functionality because function closure states are collectively tracked and used for ledger operations by nodes in the system. These embodiments also change how data may be stored within a block structure of the blockchain. For example, function closure may be tracked and stored, yielding the advantages and differences discussed above. Some further advantages realized by using FTs for blockchain transactions include, but are not limited to: (1) functions can capture real world complexity; (2) functions are deterministic, which provides predictability for smart contracts; (3) functions are highly parallelizable, which works well for block processing; (4) use of functional programming languages is widespread; and (5) with functions, secure proposals and validation can be provided using zero knowledge proofs (ZKPs), secure execution and commitment can be provided using fully homomorphic encryption (FHE), and functions are well suited for providing data privacy and processing privacy.

FHE processes encrypted data with encrypted functions to produce the same encrypted results. FHE and a functional blockchain can be combined to execute smart contracts on insecure infrastructure and optionally maintain a fully encrypted ledger at all times. An FHE-execute smart contract may thus generate an FHE validation function that can be decrypted or kept as-is. Optionally, secure commit may be performed on a secure ledger by using the FHE validation function to generate an FHE-encrypted W-set.

In summary, the FHE execution and commit may operate as follows. First, an FHE smart contract is built, installed on a node, and instantiated. An FHE proposal is then created by a client application. The smart contract uses the FHE proposal and the blockchain context to produce an FHE validation function. The FHE validation function is returned as a smart contract response. The blockchain context may or may not be FHE encrypted. The transaction is built and distributed to nodes. Each block transaction contains the FHE validation function that maintains the FHE encrypted blockchain context (i.e., the blockchain ledger and all in-flight data are always encrypted).

In some embodiments, smart contracts are expressed as functional programs that facilitate FTs. FTs may fully capture logic and preserve transaction semantics, providing lossless, comprehensive provenance. In some embodiments, FTs are relatively small such that they can be passed around the network and executed when necessary, rather than passing around large data images as is done in conventional blockchain transactions. FTs cannot share a state, so overlapping state failures do not occur, unlike conventional blockchain transactions.

In some embodiments, the smart contract (i.e., chaincode) is a function that generates a function. The smart contract may provide private and public functions and HOF s. Public function closures are generated as a result of smart contract execution for later commitment.

Referring now to FIG. 1, a process 100 for a distributed ledger transaction (DLT) is illustrated. Such a process 100 can include transaction processing that has a lifecycle that includes the following: (1) a proposal is generated by a transaction initiator; (2) the proposal is executed by a multiple independent instances of a smart contract, and each instance generates a digitally signed transaction response that represents endorsement; (3) the endorsed responses are assembled into a fully endorsed transaction; (4) transactions are sequenced in blocks for distribution (i.e., ordered) and blocks are distributed throughout the network to every node via an ordering service; and (5) each node in the network individually verifies each transaction in a block transaction according to an endorsement policy before applying the transaction to its copy of the ledger. For example, in the case of certain blockchain systems, transactions record state changes using data images. EXECUTE captures before and after states as RW-sets on a state database. COMMIT updates the state database only if the RW-set is still valid after a multi-version concurrency control (MVCC) check. This pattern is typical.

"States" represent the way the world is. For instance, a state may be a bank account balance, an amount of fuel, etc. "Transactions" capture changes in the way the world is (e.g., a reduction in the amount in a bank account, an increase in the amount of fuel, etc.). Transactions record state changes, but not state values. Transactions must be approved, and a change of state only occurs if a transaction can alter a state from one value to another. For example, a transaction to deduct $10.00 from a bank account will be valid only if there are sufficient funds in the account and the bank approves the transfer. If the transaction is valid, then the balance is reduced by $10.00.

States can be exclusive to one party or can be shared by multiple parties. An exclusive state is isolated to a single party. A shared state is accessed by some or all parties (e.g., a stock price). Both exclusive and shared states can often change frequently (e.g., frequent spending in a single bank account or rapid updates to a stock price). In the real world, frequently changing exclusive or shared states are difficult to manage because transactions can collide with one another, especially when transactional changes assume a current state value.

FIG. 2 illustrates example FT functions 200, according to example embodiments. In this example, a buyer, Daisy, decides to purchase some fuel from a gas station using a credit card. The gas station also is offering Daisy a 5% discount for being a loyal customer. Three functions are used in this example: (1) a public "Fuel" function that serves as the public entry point into the smart contract; (2) an optional private "buyFuel" function that captures confidential aspects of the smart contract and is not shared across the network; and (3) another public "transferPayment" function that provides other public aspects of the smart contract and is shipped as a response across the network.

In some embodiments, functions have output that is determined only by the function input parameters and any in-scope variable bindings. The function may have no side effects in the sense that in some embodiments, the function cannot modify any external state or any of the in-scope variables in the enclosing environment. The "environment" (also called the "context") is a set of variable bindings (i.e., name/value pairs) that are in scope when a function is evaluated. Closure refers to a combination of a function and the lexical environment within which that function was declared. HOFs are functions that operate on other functions, either via input parameters or generating a function as a return value.

In functional programming languages, HOFs are functions that, when invoked at runtime, generate and return other functions as their result. These generated functions can be invoked later in the execution of the program. The function that is generated by the HOF is composed of two parts in some embodiments: (1) the function body, which encodes the logic to be executed by the function when it is finally invoked; and (2) the enclosing environment, which is the set of variable bindings that were in scope at the time that the function was generated inside the HOF (sometimes called "lexical scoping"). This combination of the function body and the enclosing environment is called a "closure." When the closure is eventually invoked, the logic in the body of the closure is executed and will have access to read the values of the variables in the enclosing environment of the closure. HOFs are significant components in some embodiments as they provide a mechanism for smart contracts to both specify behavior and have their execution delayed. The smart contract HOF provides this mechanism in some embodiments when integrated therein.

In some embodiments, the parts of the smart contract are a public contract constructor, private transaction logic, and public transaction logic. The public contract constructor is a HOF that is invoked by the client application that will ultimately generate the transaction function closure. The private transaction logic is logic that can be applied to create the transaction parameters and will not be shared publicly before declaring the transaction function closure. For instance, in one nonlimiting example, when calculating a discounted price for a gold customer, the final price will be public, but the discount and/or reasons therefor will not be disclosed. Public transaction logic is a HOF that generates the transaction closure. The public transaction logic defines both the transaction function and the environment (variable bindings and blockchain context) under which the transaction function will get invoked during the commit stage.

Figure 3A:
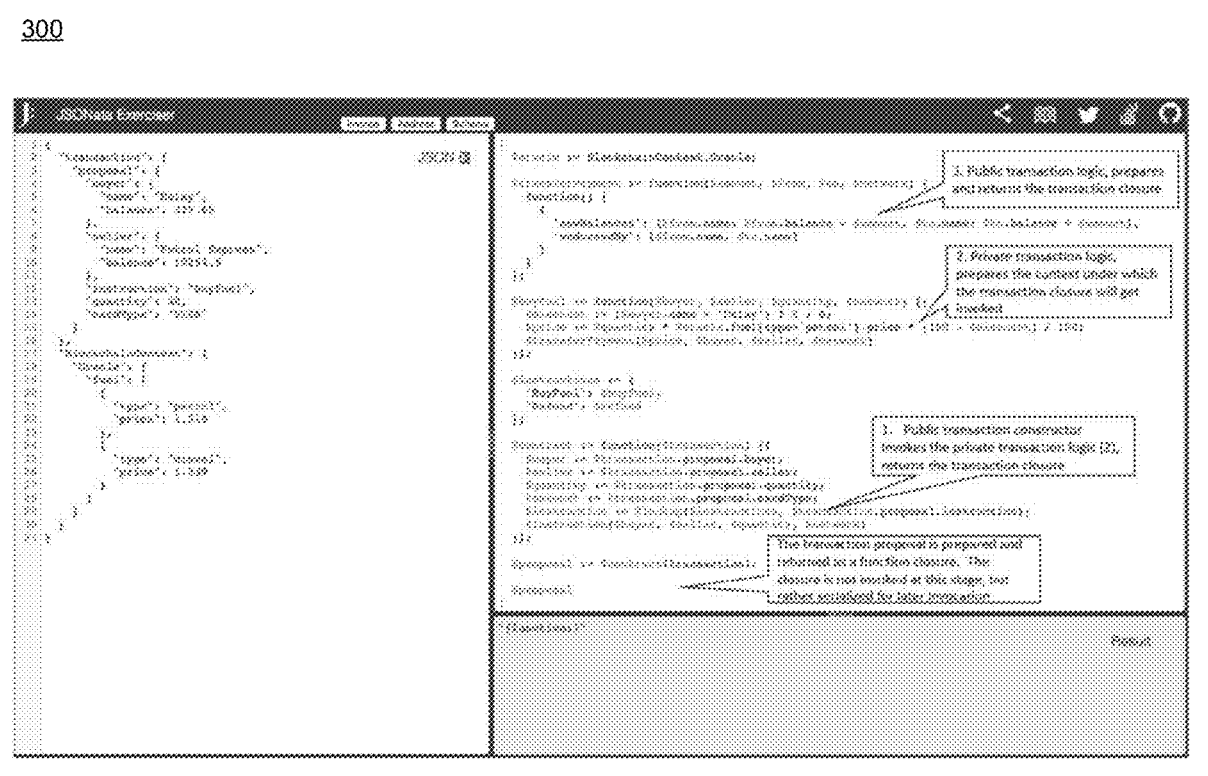

FIG. 3A is a screenshot 300 illustrating example function code for generating closure, according to example embodiments. The public transaction constructor invokes the private transaction logic, which prepares and returns the transaction closure as a function closure. However, the closure is not invoked at this stage. The private transaction logic prepares the context under which the transaction closure will be invoked.

Figure 3B:
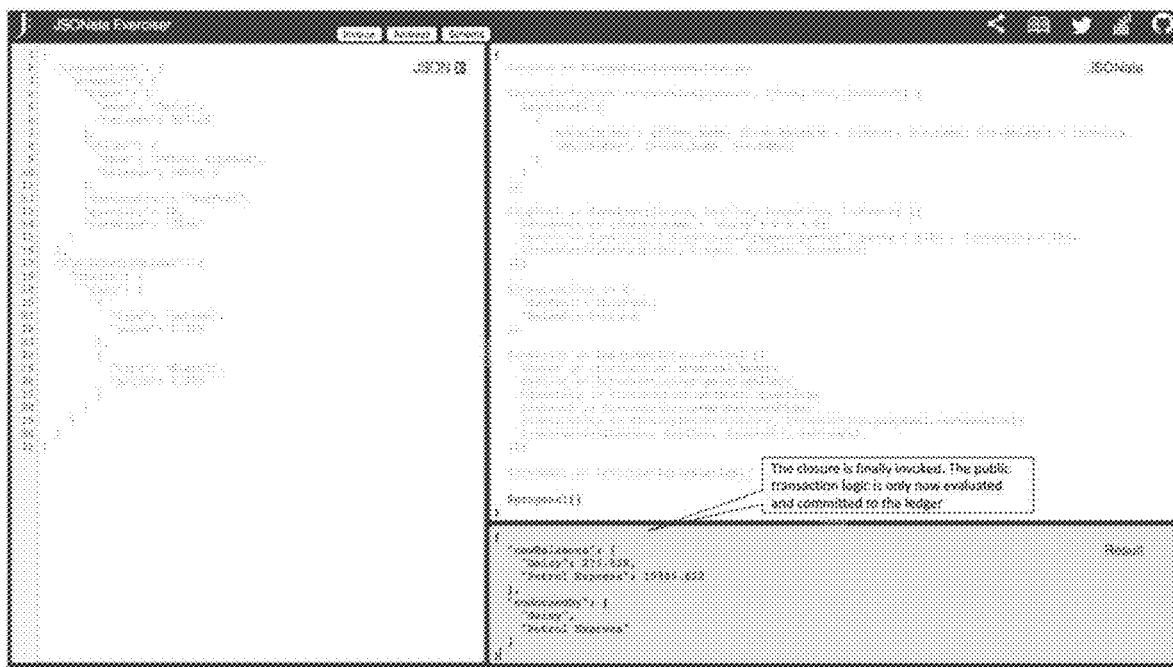
FIG. 3B is a screenshot illustrating example function code for invoking closure, according to example embodiments.

FIG. 3B is a screenshot 310 illustrating example function code for invoking closure, according to example embodiments. Per the above, the transaction closure is not invoked in FIG. 3A. When closure is finally invoked in FIG. 3B, the public transaction logic is evaluated and committed to the ledger.

FIG. 4 illustrates a five-step process 400 for how the fabric commits transactions, according to example embodiments. As with FIG. 1, the process includes propose, execute, assemble, order, and commit steps. However, the operations of each are performed with functions.

In the propose step 410, the client application creates a signed transaction proposal that contains the transaction input variables for a smart contract function. Transaction inputs of the transaction proposal are named using a naming system (i.e., a BNS). The proposal is individually sent to all organizations' chaincode, as defined by an endorsement policy. The client application then waits for all necessary responses.

In the execute step 420, a private smart contract (i.e., chaincode) uses the transaction proposal to generate a transaction response. The response is described as a public validation function. Later, the response will calculate any updates to ledger world state. It should be noted that an RW-set is not generated at this point. A validation function is then returned to the client application as a signed transaction response.

In the assemble step 430, the client application constructs a transaction including a single proposal, a single response, and multiple endorsements (i.e., one from each organization). The transaction is then submitted to the ledger via an ordering service. It is not necessary in some embodiments to provide all of the responses in the transaction, as they should all be the same. In the case where all of the responses are not the same, there will either be sufficient endorsements for a majority response as defined by the endorsement policy, in which case the ledger will be consistently updated, or the transaction will fail due to insufficient consensus. In either case, it is not necessary to include more than one response in some embodiments, so long as all endorsements are included.

In the order step 440, transactions from different client applications are ordered into blocks. Blocks are optimized for parallel processing using streams and sequences. Blocks are also cryptographically hashed and linked to one another.

In the commit step 450, the ledger update is generated as a W-set (i.e., a "write" set) using a validation function. The transaction is valid if the W-set is not nil (i.e., null) and the transaction is endorsed by the necessary organizations. All transactions, both valid and invalid, are added to the blockchain. The ledger is updated with the W-set, and the client application is notified of the ledger update.

Figure 5:
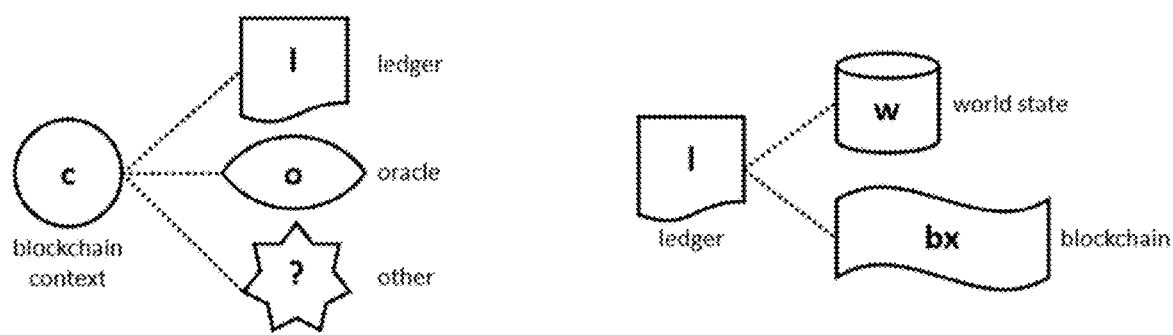
FIG. 5 illustrates a blockchain context, according to example embodiments.

FIG. 5 illustrates a blockchain context 500, according to example embodiments. The blockchain context is a set of reference information relating to a blockchain system and supports function closures. The blockchain context includes a set of bindings containing reference information relating to the blockchain system. Closures are helpful for the blockchain in some embodiments because they provide the data context for a function and they delay evaluation. Closures also allow functions to be shipped around the network (e.g., a validation function defined by a smart contract), and are only evaluated at commit time. The function and the environment combine to generate the entire ledger update, and the actual update can be any part of the blockchain context.

The blockchain context includes a ledger, an oracle for addressing external data values, and other relevant blockchain innovations as they arise (e.g., a hash-able external data store). The ledger includes the world state and the blockchain and oracle serves as a predictable reference information source. The context is addressable via a universal resource indicator (URI) scheme (e.g., /ledger/worldstate, /oracle/fxprice, etc.). It should be noted that the context does not include user and external system inputs in this embodiment.

Smart contracts often refer to external data values that vary with time (e.g., the price of fuel, which varies through the day). Deterministic smart contracts must produce consistent results. However, the value may change between execute and commit, and in some cases, the ledger may be replayed much later (sometimes years later). Accordingly, the oracle uses the BNS such that each data collection has a clear resource name and each element has a unique tick identifier. Oracle implementation may also be optimized to data access patterns. Oracle URI queries may return the required value and tick URI. The tick URI also always retrieves the same value in some embodiments.

Figure 6:
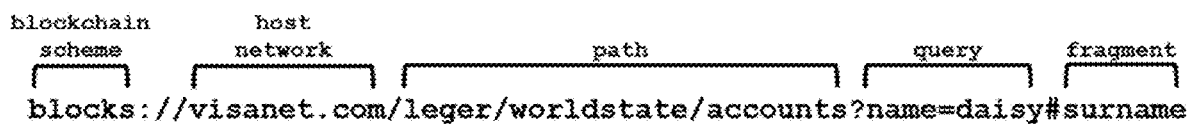
FIG. 6 illustrates a blockchain naming scheme (BNS), according to example embodiments.

FIG. 6 illustrates a BNS 600, according to example embodiments. The BNS provides a standard mechanism to name all blockchain resources using URIs, including programming (e.g., blocks://visa.com/ledger/worldstate/accounts/daisy), operational (e.g., blocks://ibmnet.com/orderer/consensus_mechanism), and query (e.g., blocks://tradenet.com/oracle/fxprice/?stock=IBM&tick=123456) resources. The BNS may identify a blockchain scheme, a host network, a path, a query, and a fragment in some embodiments. For instance, blocks://visanet.com/leger/worldstate/accounts?name=daisy#surname may identify the surname of Daisy in VISA's account. Hierarchical paths may be encouraged since they may reveal important structure (e.g., blocks://visanet/ . . . /worldstate/accounts/org/division/account/daisy). The BNS may also name information that is external to the blockchain context, such as user and system inputs to a proposal (e.g., blocks://blocknet/ . . . /inputs/system/SYSID-SAP-47/p1/161064).

Figure 7:
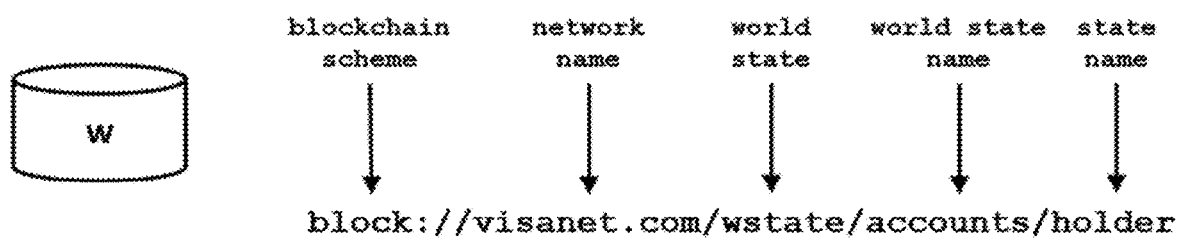
FIG. 7 illustrates a world state, according to example embodiments.

FIG. 7 illustrates a world state 700, according to example embodiments. The BNS world state provides an unambiguous way to name blockchain transaction states, and the world state is a named resource within the blockchain URI scheme. In some embodiments, the URI for the world state includes a blockchain scheme, a network name, a world state, a world state name, and a state name. As with BNS 600 of FIG. 6, hierarchical states are possible, and may be encouraged in some embodiments.

World state and BNS naming is beneficial in some embodiments since it allows formalizing of transaction inputs. Unambiguous semantics may be provided for transactions such that both inputs and outputs are clear. Hierarchical naming provides natural scoping. BNS also allows transactions to be analyzed and optimized. Parallel processing may also be employed to execute non-overlapping validation functions at the same time (e.g., vf1(in={/account/daisy, /account/PE}, out={/account/daisy, account/PE})||vf2(in={/account/petal, /account/IBM}, out={/account/petal, account/IBM}). Blocks may be optimized into non-overlapping sets of transactions for parallel processing. Blocks may also be optimized into non-overlapping sets of transactions for parallel processing. Narrow scope transactions are likely to be processed more quickly. Prioritized commitment may be provided according to organization, account, person, etc., for example.

Figure 8A:
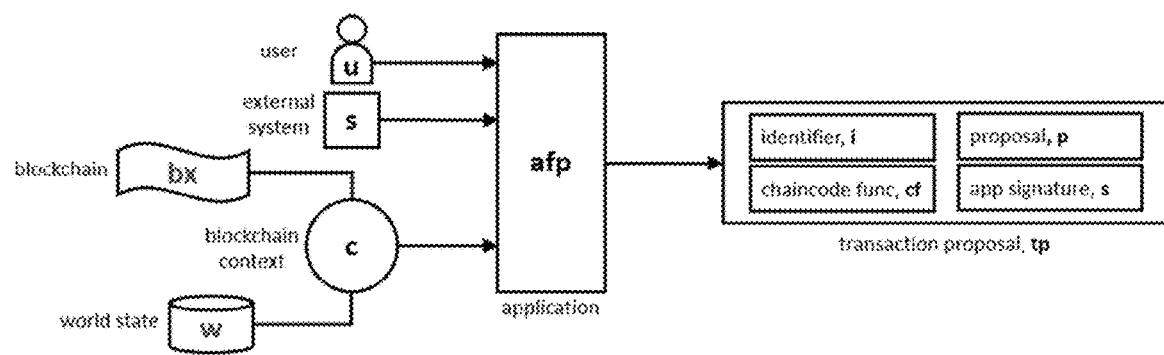
FIG. 8A illustrates a propose process, according to example embodiments.

FIG. 8A illustrates a propose process 800, according to example embodiments. A transaction proposal (tp) captures a set of inputs to a transaction. The set of inputs is determined by a combination of inputs from users (u), external systems (s), and the current blockchain context (c). (tp) is determined by an application function (afp) using input determined by a user (f(u)) and/or the system (f(s)), as well as the blockchain context (f(c)) such that:

$$tp=afp(f(u),f(s),f(c)) \qquad (1)$$

(tp) has an identifier (i) and contains the input for a chaincode function (cf) expressed as a proposal (p). (tp) also has an application signature (s). (tp) is thus defined such that:

$$tp=\{p,s,i,m, \ldots \} \qquad (2)$$

There may be other information denoted by the ellipsis as well, but p, s, i, and m are the most significant in some embodiments.

Figure 8B:
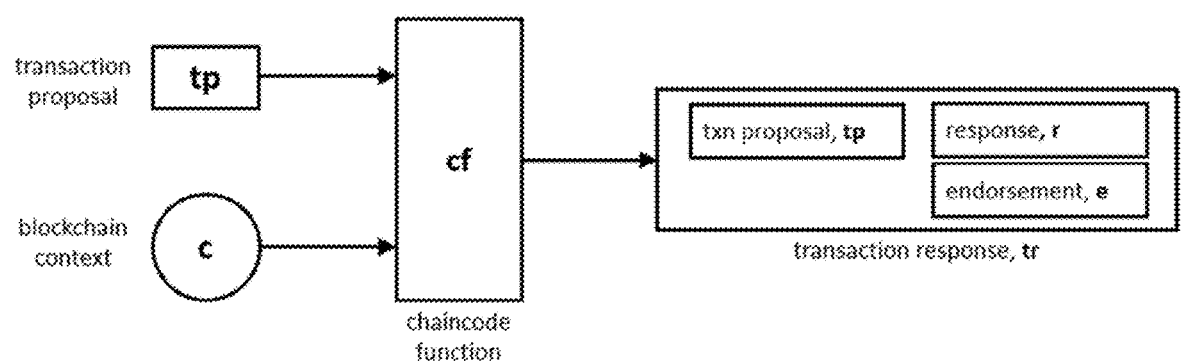
FIG. 8B illustrates an execute process, according to example embodiments.

FIG. 8B illustrates an execute process 810, according to example embodiments. A transaction response (tr) calculates a response to (tp). (tr) is generated by (cf). A key element of (tr) is a validation function (vf), which will be used at validation time to calculate the ledger update. It should be noted that this differs from the current execution phase, which calculates a RW-set of the as-is and to-be ledger world state. (tr) is determined by (cf) using (tp) and (c) such that:

$$tr=cf(tp,c) \qquad (3)$$

(tr) contains the original (tp) and a chaincode calculated response (r) for (tp). (tr) also has an endorsement (e), which is a cryptographic signature for (r). (tr) thus includes the following:

$$tr=\{tp,r,s\} \qquad (4)$$

$$r=vf(tp,c) \qquad (5)$$

Note that (r) is expressed as a function rather than a set of before and after world state values (RW-set).

Figure 8C:
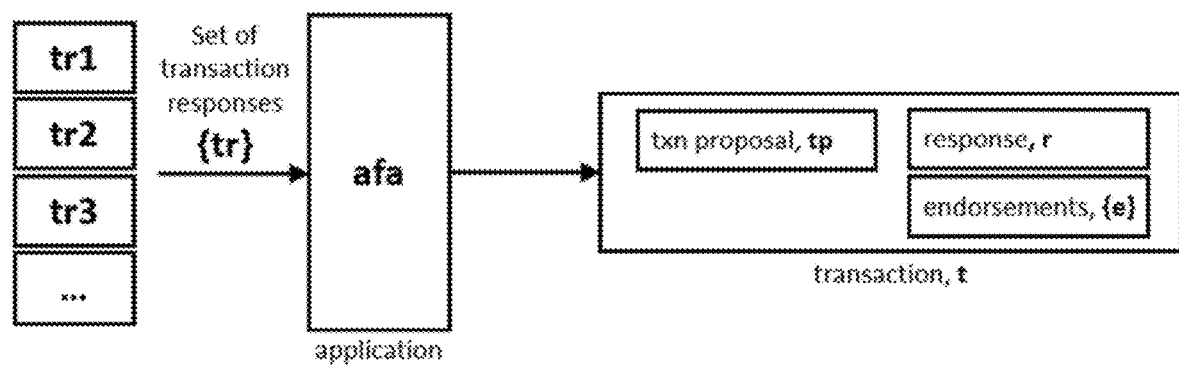
FIG. 8C illustrates an assemble process, according to example embodiments.

FIG. 8C illustrates an assemble process 820, according to example embodiments. The client application assembles a transaction (t) that will be applied to the ledger. (t) includes the original (tp). From the set of received transaction responses {tr} (i.e., {tr1, tr2, tr3, . . . }), (t) includes a single response (r) and all of the endorsements {e}. (t) is determined by an application function (afa) using {tr} such that $$t=afa(\{tr\}) \qquad (6)$$

(t) includes the following:

$$t=\{tp,r,\{e\}\} \qquad (7)$$

Ideally, all responses in {tr} should match, though this is not necessary in some embodiments. As tr.r is a function, all (tr) should be written in the same programming language. This may be considered less flexible than a value-based response approach, which appears insensitive to different chaincode programming languages. In reality, however, the same smart contract will be written in the same programming language. Moreover, chaincode could also be endorsed by each organization in the consortium as part of development governance to ensure that they were equivalent.

Figure 8D:
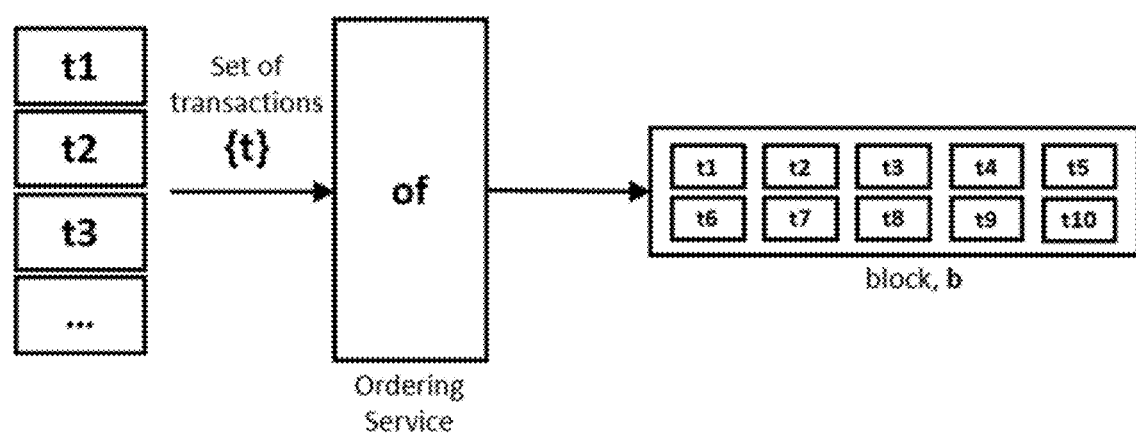
FIG. 8D illustrates an order process, according to example embodiments.

FIG. 8D illustrates an order process 830, according to example embodiments. A block (b) is an ordered sequence of transactions created by client applications. The order of transactions is determined by the ordering function (of) using a set of transactions {t}, given by:

$$b=of(\{t\}) \qquad (8)$$

Figure 8E:
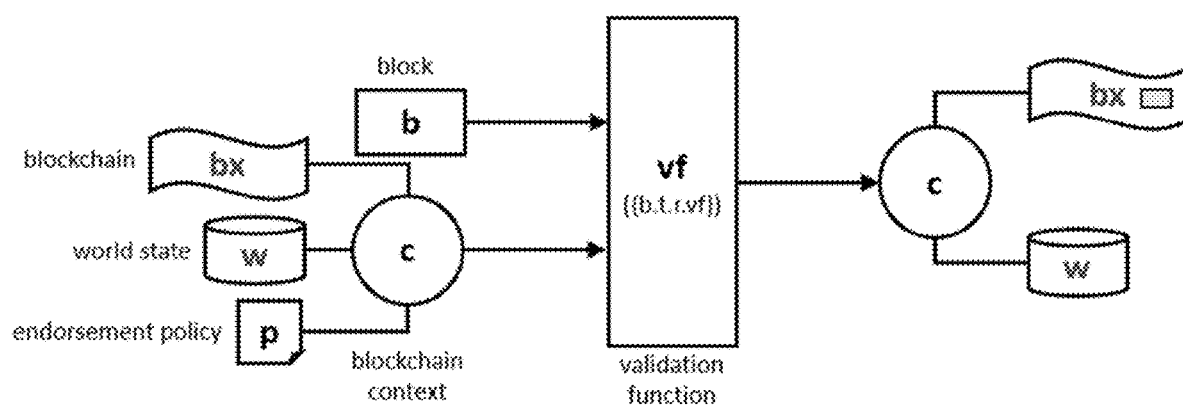
FIG. 8E illustrates a validate process, according to example embodiments.

FIG. 8E illustrates a validate process 840, according to example embodiments. Changes to the blockchain (bx) and world state (w) are calculated by a transaction validation function (vf). All transactions are added to (bx) with a valid/invalid indicator. Only valid transactions result in an update to (w). Changes to (bx) and (w) are part of a bigger set of potential changes to (c) that (vf) calculates.

The new (c) is determined by (vf), (b), and (c), the latter of which includes the current (bx), (w), and endorsement policy (p), such that:

$$c=vf(t,c) \qquad (9)$$

$$c=\{bx,w\} \qquad (10)$$

$$bx=\{bx,b\} \qquad (11)$$

(b) actually contains a (vf) for each (t) therein. The new (c) contains the new (bx) and (w). (bx) contains (b). (w) is updated for every valid transaction in (b). If required, other parts of (c) can be updated by (vf).

Figure 9:
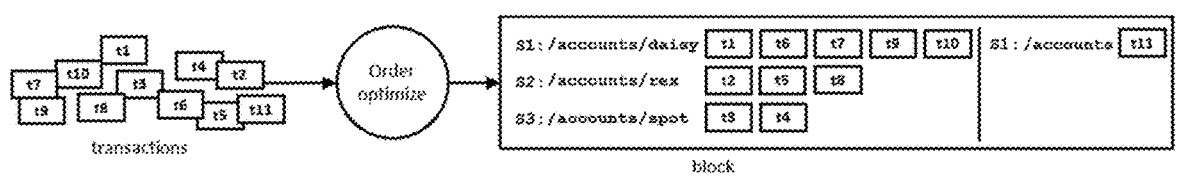
FIG. 9 illustrates a process for block optimization, according to example embodiments.

FIG. 9 illustrates a process 900 for block optimization, according to example embodiments. Ordering in some embodiments uses BNS to analyze and optimize block packaging. Streams can be executed in parallel, which provides an optimization opportunity. Sequences, however, must be executed in order.

Different block optimization strategies are possible. Typically, it is desirable for blocks to have many streams and few sequences to facilitate parallelization. One option is to delay low parallelism transactions into a later, better optimized block. Transactions that have overlapping inputs or outputs are subject to low parallelism. Such transactions can readily be detected using the BNS world state naming. By looking at common roots in the naming system, for transaction inputs and outputs, sequential transactions can be detected. For instance, transactions /accounts/daisy and /accounts/rex do not overlap with each other, but they both overlap with /accounts. The rule in some embodiments is that any set of transaction inputs and outputs must not contain any other transaction whose full path is a subpath of any other transaction path within the set.

Figure 10:
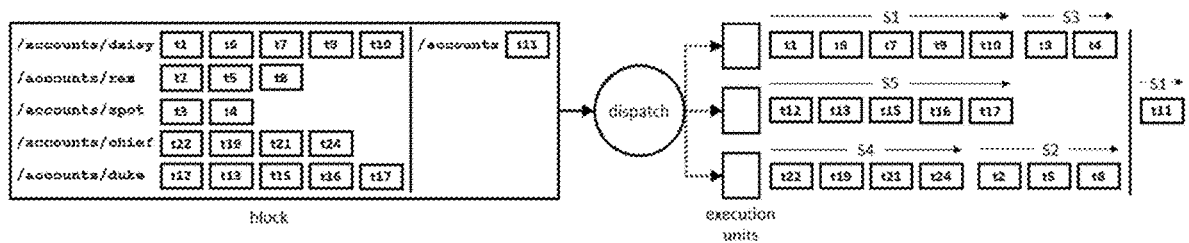
FIG. 10 illustrates a process for parallel validation, according to example embodiments.

FIG. 10 illustrates a process 1000 for parallel validation, according to example embodiments. Validation in some embodiments uses the BNS world state naming to analyze and optimize block processing. Per the above, streams run in parallel while sequences must run serially to ensure correctness. Sequences of two transactions may be required when the two transactions operate on the same resource.

Blockchain transaction validation takes blocks that have been ordered into streams and sequences and optimally dispatches them across multiple execution units (i.e., threads, processors, cores, machines, etc.). Streams can be executed in parallel to support high utilization of processing, network, and memory resources. Optimally correct execution mechanisms can be defined as required. The default mechanism in some embodiments is to dispatch unprocessed transaction streams to available execution units until a sequence is exhausted. This mechanism also enables the introduction of sophisticated buffer management techniques that allow one or more streams of transactions processed on an execution unit to be captured in a single input/output (I/O) operation. In other words, I/O is deferred until the end of the block. This leads to a significant I/O reduction.

The use of a naming system to separate transactions into sequences allows data to be fetched and stored in a working set of in-memory buffers, while being confident that affected is are not being changed by any parallel stream. The set of data in a sequence of transactions can therefore be loaded and modified in the in-memory buffers, updated by transactions, and then written back to disk in a single I/O operation with confidence. Generally speaking, the goal is to minimize total processing time across a fixed set of execution units.

Figure 11:
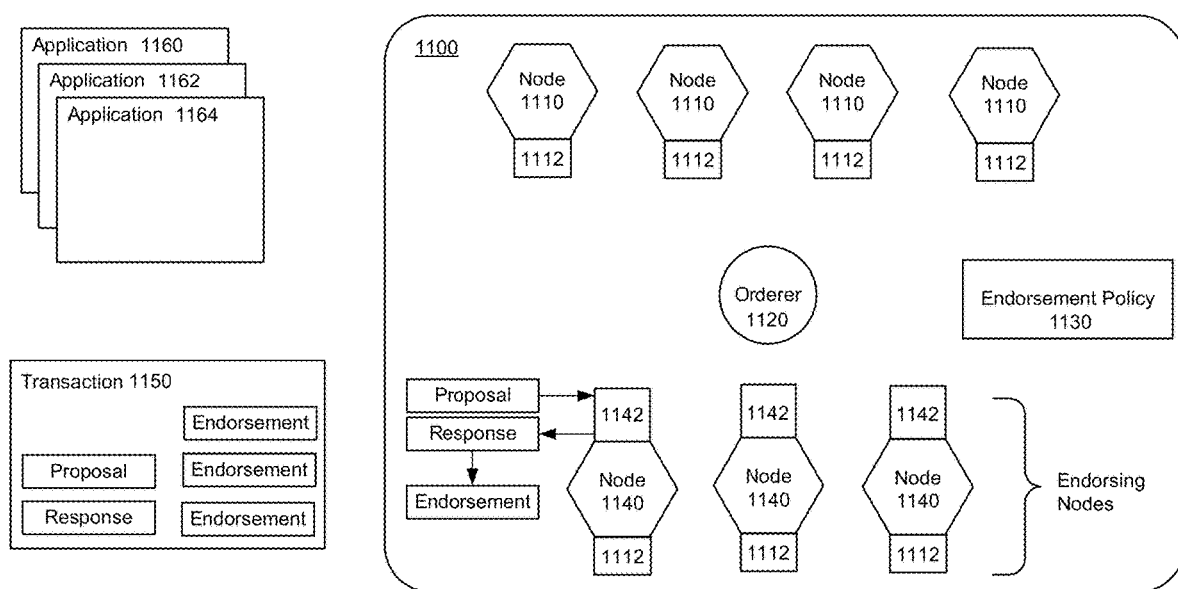
FIG. 11 illustrates a logic network diagram of a blockchain network, according to example embodiments.

FIG. 11A illustrates a logic network diagram of a blockchain network 1100, according to example embodiments. Referring to FIG. 11A, network 1100 includes nodes 1110 that each maintain a copy of a ledger 1112. Network 1100 also includes an orderer 1120 and an endorsement policy 1130.

Endorsing nodes 1140 also maintain a copy of ledger 1112, but additionally include a smart contract 1142 for evaluating proposals. A transaction 1150 is a combination of an input (i.e., a proposal), an output (i.e., a response), and multiple endorsements. Applications 1160, 1162, 1164 (i.e., client applications) use smart contracts 1142 on endorsing nodes 1140 to generate endorsed proposals from responses. Transactions are distributed to every node 1110, 1140 (both endorsing and non-endorsing nodes) via orderer 1120 for inclusion in every node's ledger 1112. Transactions 1150 are recorded as valid if they conform to endorsement policy 1130.

Generally speaking, an application (e.g., application 1160, 1162, or 1164) constructs a proposal and sends the proposal to an organization's endorsing nodes 1140. For each endorsing node 1140, smart contract 1142 uses the proposal and the current version of ledger 1112 to create a response containing a transaction validation function. The application then receives proposal responses from each endorsing node 1140.

Once the responses have been received, the application assembles the responses into transaction 1150 and sends transaction 1150 to orderer 1120 for distribution. Orderer 1120 packages transactions 1150 into blocks and distributes the blocks to every node 1110, 1140 in network 1110. Nodes 1110, 1140 unpack each transaction 1150 from the blocks and use their embedded validation function to update ledger 1112. Nodes 1110/1140 then notify the application when the transaction/block was processed by ledger 1112.

Figure 12A:
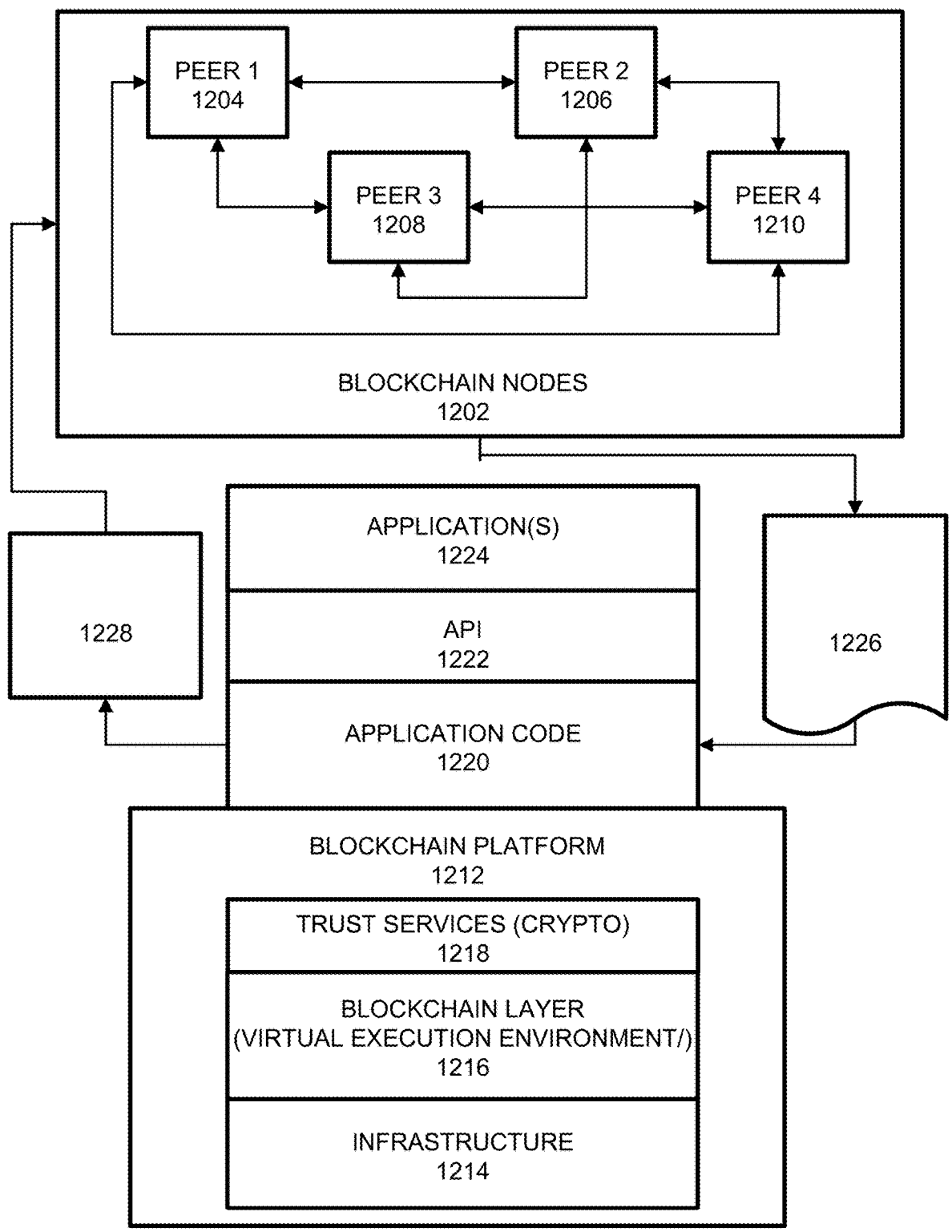
FIG. 12A illustrates an example peer node configuration, according to example embodiments.

FIG. 12A illustrates a blockchain architecture configuration 1200, according to example embodiments. In some embodiments, this architecture may be implemented using BNS, FTs, or both. Referring to FIG. 12A, the blockchain architecture 1200 may include certain blockchain elements, for example, a group of blockchain nodes 1202. The blockchain nodes 1202 may include one or more nodes 1204-1210 (these four nodes are depicted by example only). These nodes participate in a number of activities, such as blockchain transaction addition and validation process (consensus). One or more of the blockchain nodes 1204-1210 may endorse transactions based on endorsement policy and may provide an ordering service for all blockchain nodes in the architecture 1200. A blockchain node may initiate a blockchain authentication and seek to write to a blockchain immutable ledger stored in blockchain layer 1216, a copy of which may also be stored on the underpinning physical infrastructure 1214. The blockchain configuration may include one or more applications 1224 which are linked to application programming interfaces (APIs) 1222 to access and execute stored program/application code 1220 (e.g., chaincode, smart contracts, etc.) which can be created according to a customized configuration sought by participants and can maintain their own state, control their own assets, and receive external information. This can be deployed as a transaction and installed, via appending to the distributed ledger, on all blockchain nodes 1204-1210.

The blockchain base or platform 1212 may include various layers of blockchain data, services (e.g., cryptographic trust services, virtual execution environment, etc.), and underpinning physical computer infrastructure that may be used to receive and store new transactions and provide access to auditors which are seeking to access data entries. The blockchain layer 1216 may expose an interface that provides access to the virtual execution environment necessary to process the program code and engage the physical infrastructure 1214. Cryptographic trust services 1218 may be used to verify transactions such as asset exchange transactions and keep information private.

The blockchain architecture configuration of FIG. 12A may process and execute program/application code 1220 via one or more interfaces exposed, and services provided, by blockchain platform 1212. The code 1220 may control blockchain assets. For example, the code 1220 can store and transfer data, and may be executed by nodes 1204-1210 in the form of a smart contract and associated chaincode with conditions or other code elements subject to its execution. As a non-limiting example, smart contracts may be created to execute reminders, updates, and/or other notifications subject to the changes, updates, etc. The smart contracts can themselves be used to identify rules associated with authorization and access requirements and usage of the ledger. For example, the information 1226, including FTs, may be processed by one or more processing entities (e.g., virtual machines) included in the blockchain layer 1216. The result 1228 may include function closures. The physical infrastructure 1214 may be utilized to retrieve any of the data or information described herein.

Within chaincode, a smart contract may be created via a high-level application and programming language, and then written to a block in the blockchain. The smart contract may include executable code which is registered, stored, and/or replicated with a blockchain (e.g., distributed network of blockchain peers). A transaction is an execution of the smart contract code which can be performed in response to conditions associated with the smart contract being satisfied. The executing of the smart contract may trigger a trusted modification(s) to a state of a digital blockchain ledger. The modification(s) to the blockchain ledger caused by the smart contract execution may be automatically replicated throughout the distributed network of blockchain peers through one or more consensus protocols.

The smart contract may write data to the blockchain in the format of key-value pairs. Furthermore, the smart contract code can read the values stored in a blockchain and use them in application operations. The smart contract code can write the output of various logic operations into the blockchain. The code may be used to create a temporary data structure in a virtual machine or other computing platform. Data written to the blockchain can be public and/or can be encrypted and maintained as private. The temporary data that is used/generated by the smart contract is held in memory by the supplied execution environment, then deleted once the data needed for the blockchain is identified.

A chaincode may include the code interpretation of a smart contract, with additional features. As described herein, the chaincode may be program code deployed on a computing network, where it is executed and validated by chain validators together during a consensus process. The chaincode receives a hash and retrieves from the blockchain a hash associated with the data template created by use of a previously stored feature extractor. If the hashes of the hash identifier and the hash created from the stored identifier template data match, then the chaincode sends an authorization key to the requested service. The chaincode may write to the blockchain data associated with the cryptographic details. In FIG. 2A, transactions may be committed at 1226. FTs may be submitted for validation at 1228, which may be provided to one or more of the nodes 1204-1210.

Figure 12B:
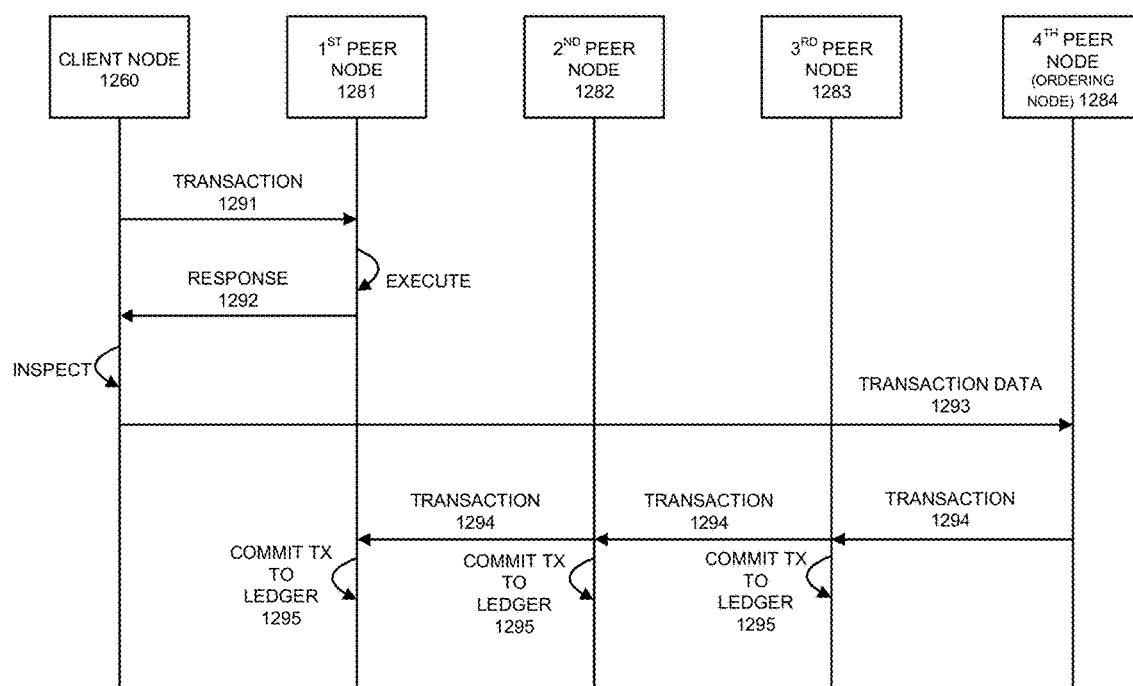
FIG. 12B illustrates a further peer node configuration, according to example embodiments.

FIG. 2B illustrates an example of a transactional flow 1250 between nodes of the blockchain in accordance with an example embodiment. Referring to FIG. 12B, the transaction flow may include a transaction proposal 1291 sent by an application client node 1260 to an endorsing peer node 1281. The endorsing peer 1281 may verify the client signature and execute a chaincode function to initiate the transaction. The output may include the chaincode results. The proposal response 1292 is sent back to the client 1260 along with an endorsement signature, if approved. The client 1260 assembles the endorsements into a transaction payload 1293 and broadcasts it to an ordering service node 1284. The ordering service node 1284 then delivers ordered transactions as blocks to all peers 1281-1283 on a channel. Before committal to the blockchain, each peer 1281-1283 may validate the transaction. For example, the peers may check the endorsement policy to ensure that the correct allotment of the specified peers have signed the results and authenticated the signatures against the transaction payload 1293.

Referring again to FIG. 12B, the client node 1260 initiates the transaction 1291 by constructing and sending a request to the peer node 1281, which is an endorser. The client 1260 may include an application leveraging a supported software development kit (SDK), such as NODE, JAVA, PYTHON, and the like, which utilizes an available API to generate a transaction proposal. The proposal is a request to invoke a chaincode function so that data can be written to the ledger. The SDK may serve as a shim to package the transaction proposal into a properly architected format (e.g., protocol buffer over a remote procedure call (RPC)) and take the client's cryptographic credentials to produce a unique signature for the transaction proposal.

In response, the endorsing peer node 1281 may verify: (a) that the transaction proposal is well formed; (b) that the transaction has not been submitted already in the past (replay-attack protection); (c) that the signature is valid; and (d) that the submitter (client 1260, in the example) is properly authorized to perform the proposed operation on that channel. The endorsing peer node 1281 may take the transaction proposal inputs as arguments to the invoked chaincode function. The chaincode is then executed against a current state database to produce transaction results. However, no updates are made to the ledger at this point. In 1292, the set of values, along with the endorsing peer node's 1281 signature is passed back as a proposal response 1292 to the SDK of the client 1260, which parses the payload for the application to consume.

In response, the application of the client 1260 inspects/verifies the endorsing peers signatures and compares the proposal responses to determine whether the proposal response is the same. If the chaincode only queried the ledger, the application would inspect the query response and would typically not submit the transaction to the ordering node service 1284. If the client application intends to submit the transaction to the ordering node service 1284 to update the ledger, the application determines if the specified endorsement policy has been fulfilled before submitting (i.e., did all peer nodes necessary for the transaction endorse the transaction). Here, the client may include only one of multiple parties to the transaction. In this case, each client may have their own endorsing node, and each endorsing node will need to endorse the transaction. The architecture is such that even if an application selects not to inspect responses or otherwise forwards an unendorsed transaction, the endorsement policy will still be enforced by peers and upheld at the commit validation phase.

After successful inspection, in step 1293 the client 1260 assembles endorsements into a transaction and broadcasts the transaction proposal and response within a transaction message to the ordering node 1284. In addition to the function(s), the transaction may contain the endorsing peers signatures and a channel ID. The ordering node 1284 does not need to inspect the entire content of a transaction in order to perform its operation in some embodiments. Instead, the ordering node 1284 may simply receive transactions from all channels in the network, order them chronologically by channel, and create blocks of transactions per channel.

The blocks of the transaction are delivered from the ordering node 1284 to all peer nodes 1281-1283 on the channel. The transactions 1294 within the block are validated to ensure any endorsement policy is fulfilled and to ensure that there have been no changes to ledger state. Transactions in the block are tagged as being valid or invalid. Furthermore, in step 1295 each peer node 1281-1283 appends the block to the channel's chain, and for each valid transaction, the write sets are committed to current state database. An event is emitted, to notify the client application that the transaction (invocation) has been immutably appended to the chain, as well as to notify whether the transaction was validated or invalidated.

Figure 13:
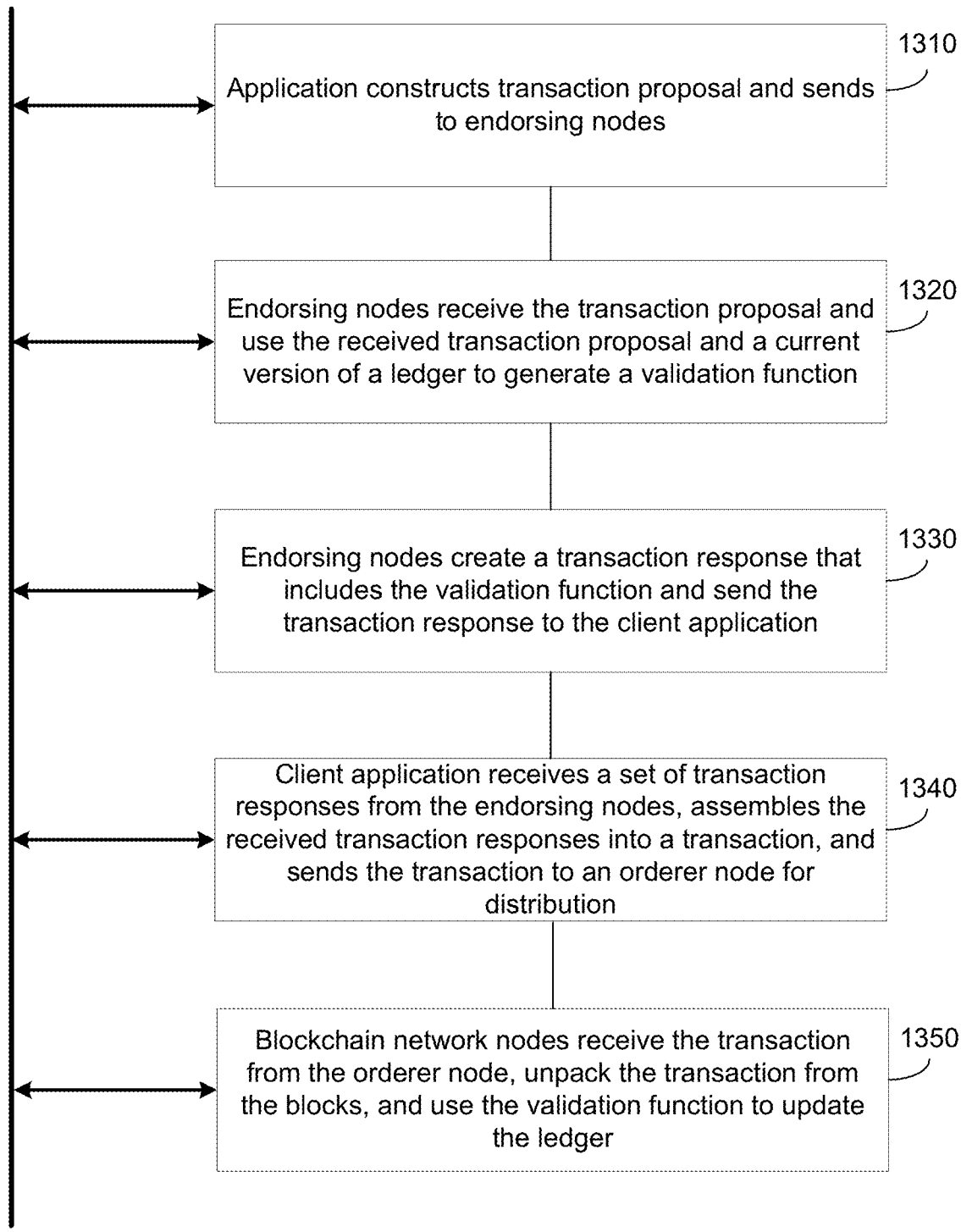
FIG. 13 illustrates a flow diagram illustrating an example method of facilitating a functional transaction, according to example embodiments.

FIG. 13 illustrates a flow diagram 1300 of an example method of facilitating a functional transaction, according to example embodiments. The method begins with a client application constructing a transaction proposal and sending the constructed transaction proposal to a plurality of endorsing nodes at 1310. The plurality of endorsing nodes then receive the transaction proposal and use the received transaction proposal and a current version of a ledger to generate a validation function at 1320. The endorsing nodes create a transaction response that includes the validation function and send the transaction response including the validation function to the client application at 1330.

The client application receives a set of transaction responses the plurality of endorsing nodes, assembles the received transaction responses into a transaction, and sends the transaction to an orderer node for distribution at 1340. The orderer node packages the transaction into blocks and transmits the transaction to nodes in a blockchain network. The nodes then receive the transaction from the orderer node, unpack the transaction from the blocks, and use the validation function to update the ledger at 1350.

Figure 14:
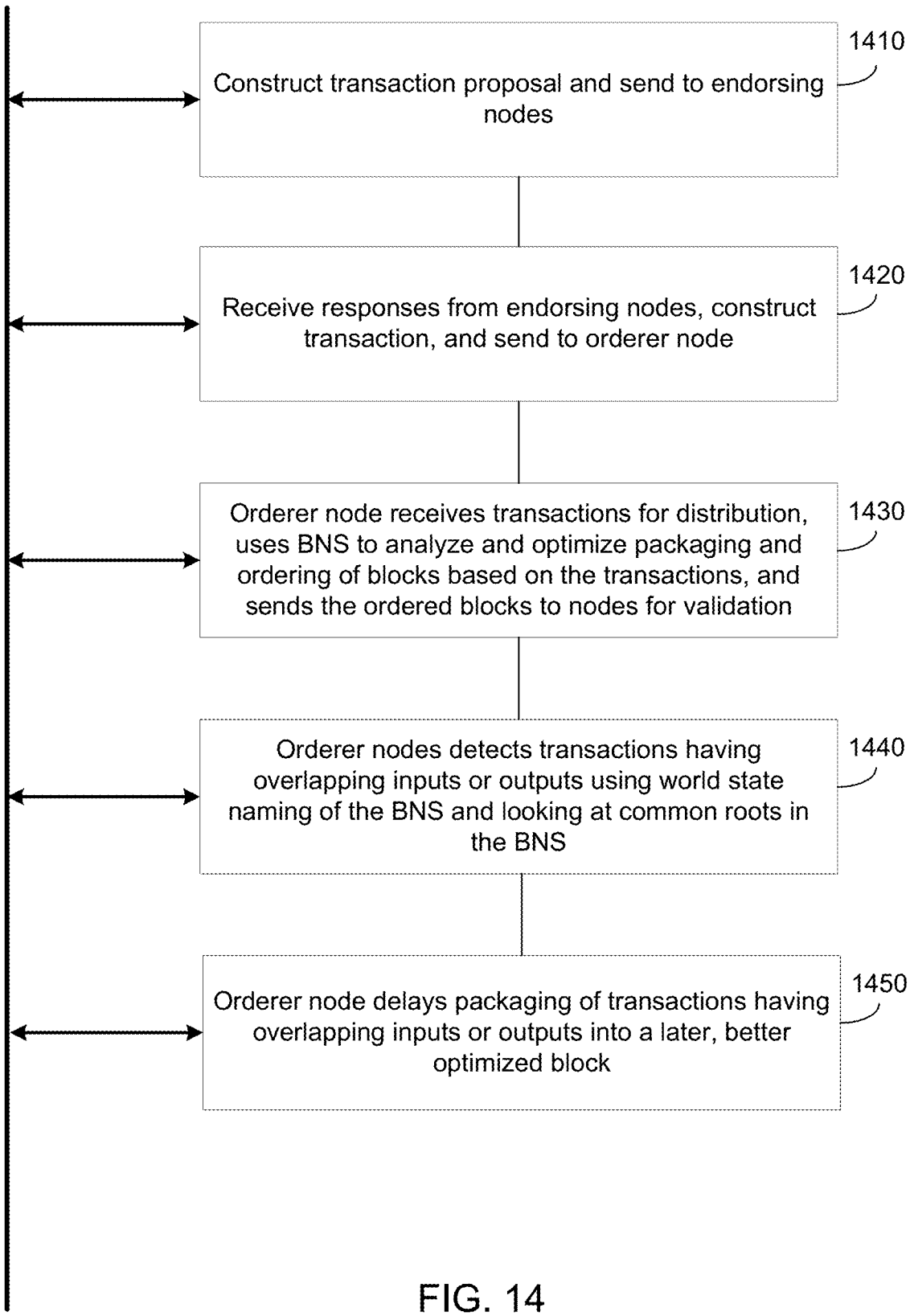
FIG. 14 illustrates a flow diagram illustrating an example method of facilitating blockchain transactions using a BNS, according to example embodiments.

FIG. 14 illustrates a flow diagram 1400 of an example method of facilitating blockchain transactions using a BNS, according to example embodiments. A transaction proposal is constructed and sent to endorsing nodes at 1410. The inputs to the transaction proposal are named using a BNS that includes ledger state addressing, oracles for addressing external data values, and user state addressing. The BNS provides a standard mechanism to name all blockchain resources using a URI. Responses are received from the endorsing nodes and a transaction is constructed and sent to an orderer node at 1420.

The orderer node receives transactions for distribution, uses the BNS to analyze and optimize packaging and ordering of blocks based on the transactions, and sends the ordered blocks to nodes of a blockchain network for validation. The blocks are ordered such that streams can be executed in parallel while sequences are executed in order, facilitating parallelization. The orderer nodes detects transactions having overlapping inputs or outputs using world state naming of the BNS and looking at common roots in the BNS at 1440. The orderer node then delays packaging of the transactions having overlapping inputs or outputs into a later, better optimized block at 1450.

Figure 15A:
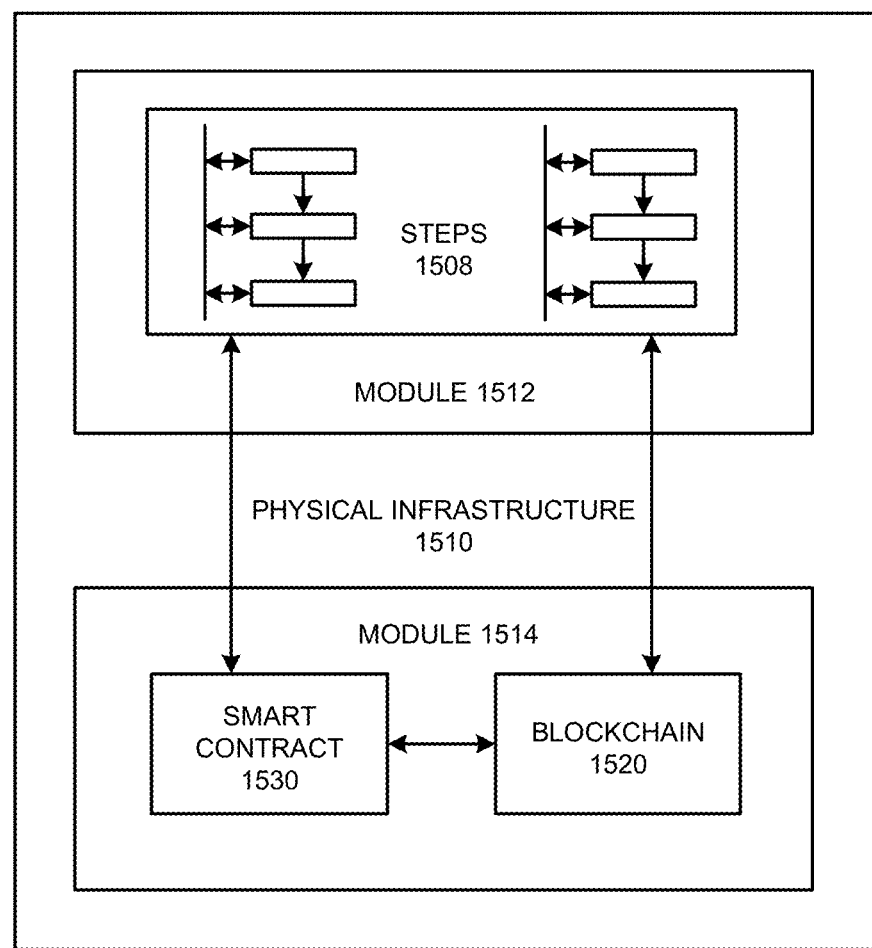
FIG. 15A illustrates an example system configured to perform one or more operations described herein, according to example embodiments.

FIG. 15A illustrates an example system 1500 that includes a physical infrastructure 1510 configured to perform various operations, according to example embodiments. Referring to FIG. 15A, the physical infrastructure 1510 includes modules 1512, 1514. The module 1514 includes a blockchain 1520 and a smart contract 1530 (which may reside on the blockchain 1520), that may execute any of the operational steps 1508 (in module 1512) included in any of the example embodiments. The steps/operations 1508 may include one or more of the embodiments described or depicted and may represent output or written information that is written or read from one or more smart contracts 1530 and/or blockchains 1520. The physical infrastructure 1510, the module 1512, and the module 1514 may include one or more computers, servers, processors, memories, and/or wireless communication devices. Further, modules 1512, 1514 may be the same module in some embodiments.

Figure 15B:
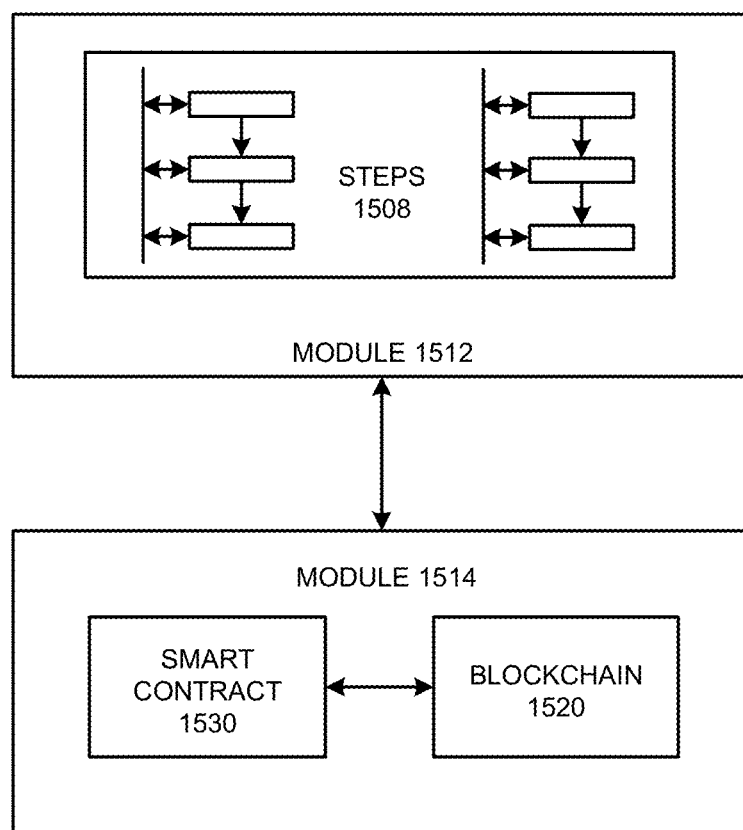
FIG. 15B illustrates a further example system configured to perform one or more operations described herein, according to example embodiments.

FIG. 15B illustrates an example system 1540 configured to perform various operations, according to example embodiments. Referring to FIG. 15B, the system 1540 includes modules 1512, 1514. The module 1514 includes a blockchain 1520 and a smart contract 1530 (which may reside on the blockchain 1520), that may execute any of the operational steps 1508 (in module 1512) included in any of the example embodiments. The steps/operations 1508 may include one or more of the embodiments described or depicted and may represent output or written information that is written or read from one or more smart contracts 1530 and/or blockchains 1520. The physical infrastructure 1510, the module 1512, and the module 1514 may include one or more computers, servers, processors, memories, and/or wireless communication devices. Further, modules 1512, 1514 may be the same module in some embodiments.

Figure 15C:
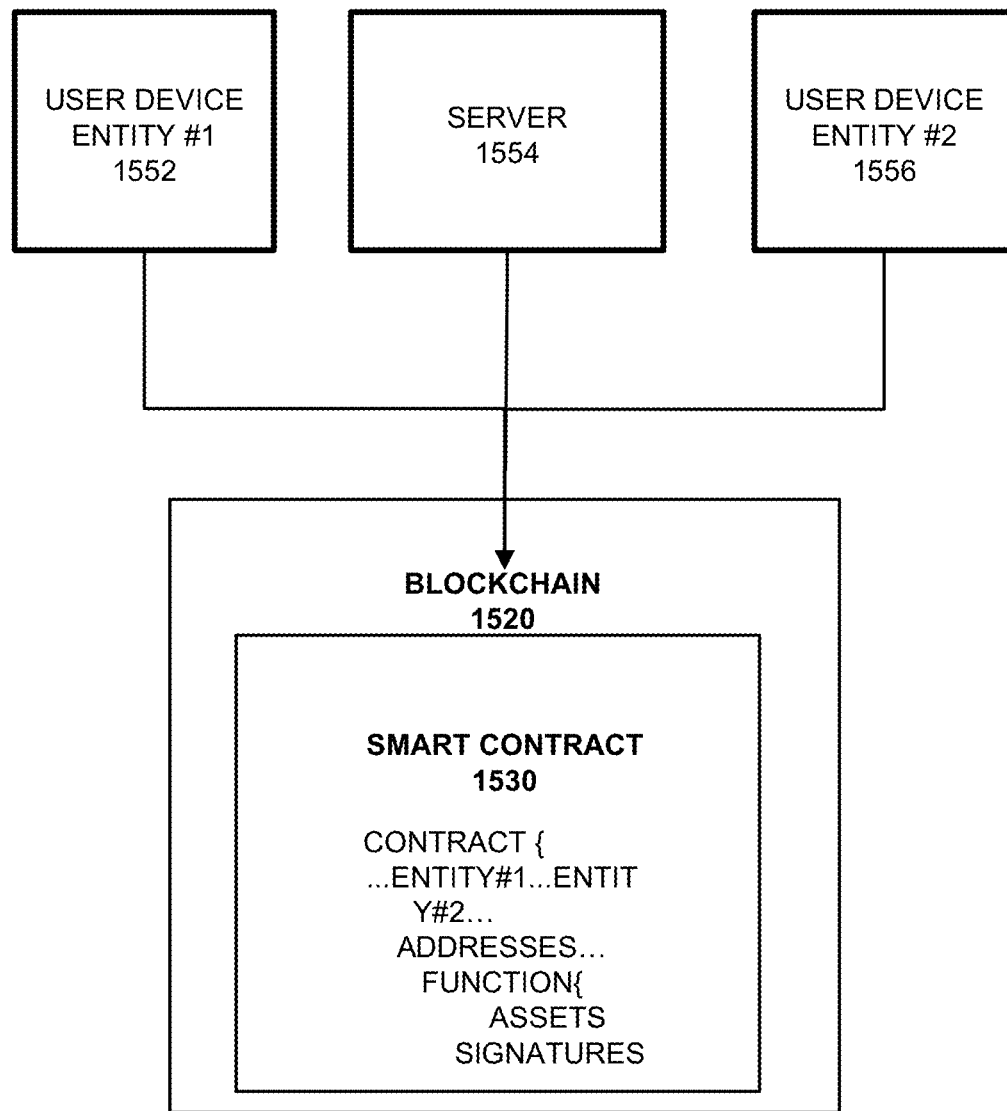
FIG. 15C illustrates a smart contract configuration among contracting parties and a mediating server configured to enforce the smart contract terms on the blockchain according to example embodiments.

FIG. 15C illustrates an example smart contract configuration among contracting parties and a mediating server configured to enforce the smart contract terms on the blockchain, according to example embodiments. Referring to FIG. 15C, the configuration 1550 may represent a communication session, an asset transfer session or a process or procedure that is driven by a smart contract 1530 which explicitly identifies one or more user devices 1552 and/or 1556. The execution, operations, and results of the smart contract execution may be managed by a server 1554. Content of the smart contract 1530 may require digital signatures by one or more of the entities 1552 and 1556, which are parties to the smart contract transaction. The results of the smart contract execution may be written to a blockchain 1520 as a blockchain transaction. The smart contract 1530 resides on the blockchain 1520 which may reside on one or more computers, servers, processors, memories, and/or wireless communication devices.

Figure 15D:
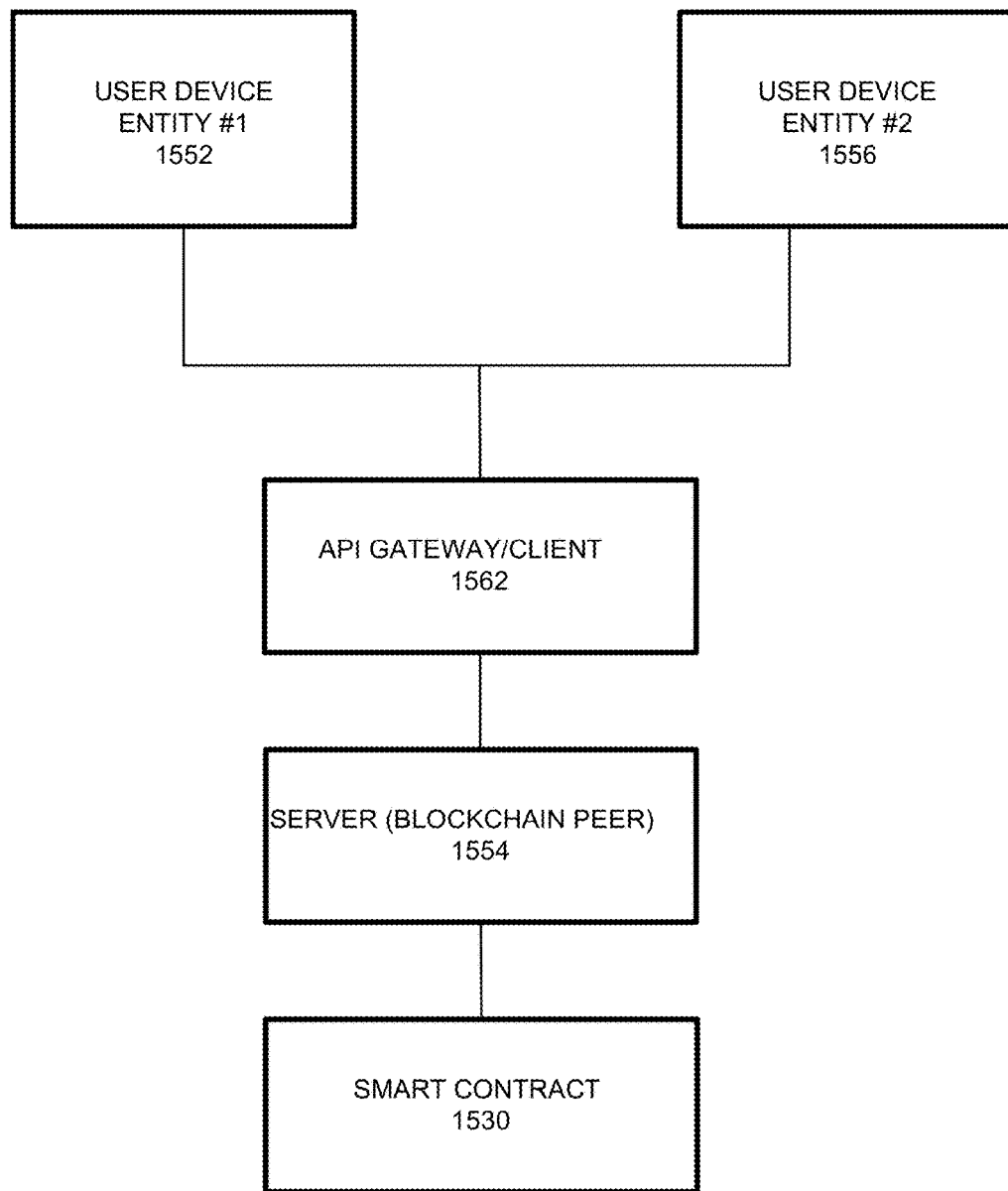
FIG. 15D illustrates another an additional example system, according to example embodiments.

FIG. 15D illustrates a common interface for accessing logic and data of a blockchain, according to example embodiments. Referring to the example of FIG. 15D, an application programming interface (API) gateway 1562 provides a common interface for accessing blockchain logic (e.g., smart contract 1530 or other chaincode) and data (e.g., distributed ledger, etc.). In this example, the API gateway 1562 is a common interface for performing transactions (invoke, queries, etc.) on the blockchain by connecting one or more entities 1552 and 1556 to a blockchain peer (i.e., server 1554). Here, the server 1554 is a blockchain network peer component that holds a copy of the world state and a distributed ledger, allowing clients 1552 and 1556 to query data on the world state as well as submit transactions into the blockchain network where, depending on the smart contract 1530 and endorsement policy, endorsing peers will run the smart contracts 1530.

The above embodiments may be implemented in hardware, in a computer program executed by a processor, in firmware, or in a combination of the above. A computer program may be embodied on a computer readable medium, such as a storage medium. For example, a computer program may reside in random access memory ("RAM"), flash memory, read-only memory ("ROM"), erasable programmable read-only memory ("EPROM"), electrically erasable programmable read-only memory ("EEPROM"), registers, hard disk, a removable disk, a compact disk read-only memory ("CD-ROM"), or any other form of storage medium known in the art.

An exemplary storage medium may be coupled to the processor such that the processor may read information from, and write information to, the storage medium. In the alternative, the storage medium may be integral to the processor. The processor and the storage medium may reside in an application specific integrated circuit ("ASIC"). In the alternative, the processor and the storage medium may reside as discrete components.

Figure 16:
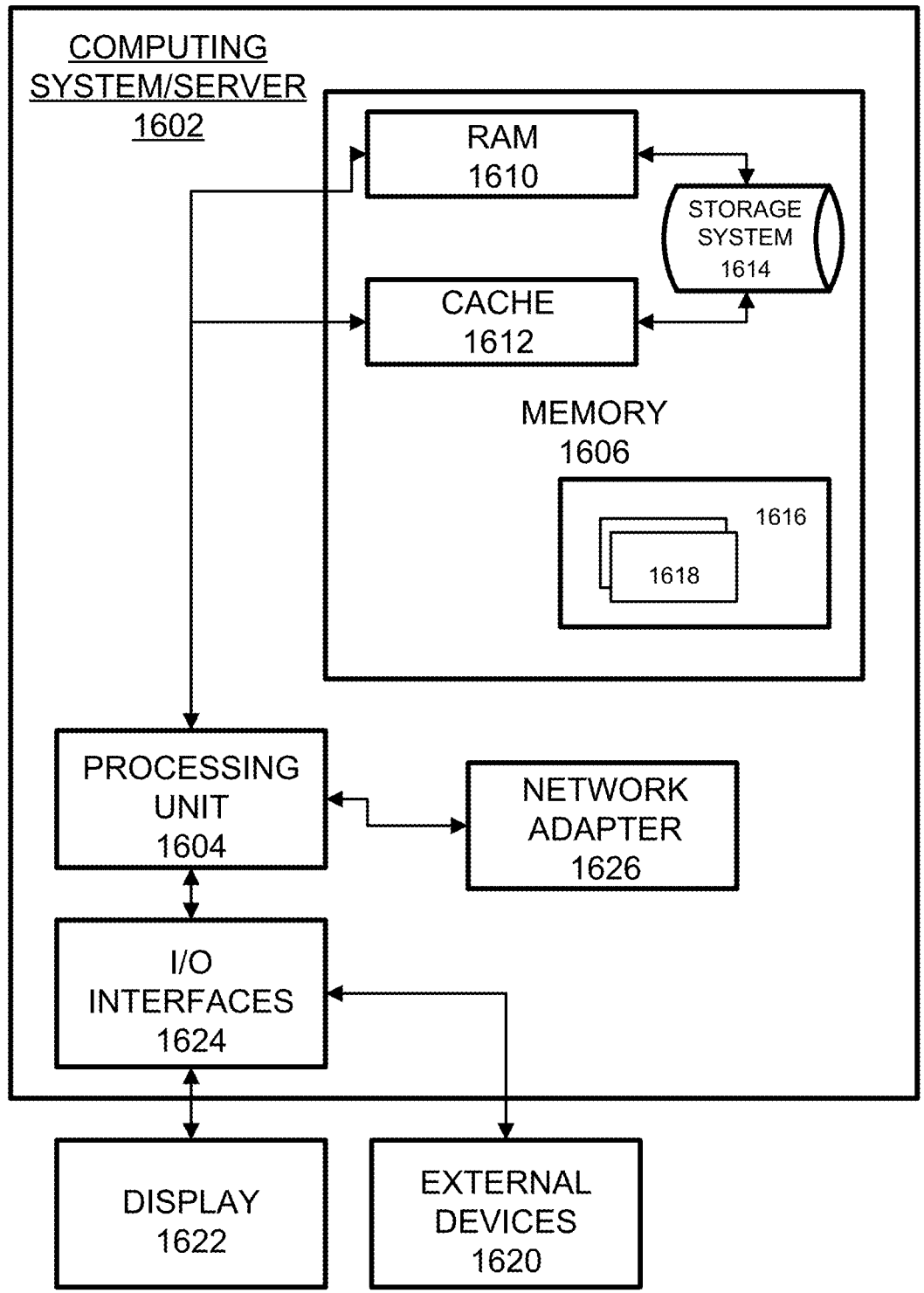
FIG. 16 illustrates an example system that supports one or more of the example embodiments.

FIG. 16 is not intended to suggest any limitation as to the scope of use or functionality of embodiments of the application described herein. Regardless, the computing node 1600 is capable of being implemented and/or performing any of the functionality set forth hereinabove.

In computing node 1600 there is a computing system/server 1602, which is operational with numerous other general purpose or special purpose computing system environments or configurations. Examples of well-known computing systems, environments, and/or configurations that may be suitable for use with computing system/server 1602 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computing system/server 1602 may be described in the general context of computing system-executable instructions, such as program modules, being executed by a computing system. Generally, program modules may include routines, programs, objects, components, logic, data structures, and so on that perform particular tasks or implement particular abstract data types. Computing system/server 1602 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 16, computing system/server 1602 in cloud computing node 1600 is shown in the form of a general-purpose computing device. The components of computing system/server 1602 may include, but are not limited to, one or more processors or processing units 1604, a system memory 1606, and a bus that couples various system components including system memory 1606 to processor 1604.

The bus represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computing system/server 1602 typically includes a variety of computing system-readable media. Such media may be any available media that is accessible by computing system/server 1602, and it includes both volatile and non-volatile media, removable and non-removable media. System memory 1606, in some embodiments, implements the flow diagrams of the other figures. The system memory 1606 can include computing system-readable media in the form of volatile memory, such as random-access memory (RAM) 1610 and/or cache memory 1612. Computing system/server 1602 may further include other removable/non-removable, volatile/non-volatile computer system storage media. By way of example only, storage system 1614 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to the bus by one or more data media interfaces. As will be further depicted and described below, memory 1606 may include at least one program product having a set (e.g., at least one) of program modules that are configured to carry out the functions of various embodiments of the application.

Program/utility 1616, having a set (at least one) of program modules 1618, may be stored in memory 1606 by way of example, and not limitation, as well as an operating system, one or more application programs, other program modules, and program data. Each of the operating system, one or more application programs, other program modules, and program data or some combination thereof, may include an implementation of a networking environment. Program modules 1618 generally carry out the functions and/or methodologies of various embodiments of the application as described herein.

As will be appreciated by one skilled in the art, aspects of the present application may be embodied as a system, method, or computer program product. Accordingly, aspects of the present application may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present application may take the form of a computer program product embodied in one or more computer readable medium(s) having computer readable program code embodied thereon.

Computing system/server 1602 may also communicate with one or more external devices 1620, such as a keyboard, a pointing device, a display 1622, etc.; one or more other devices that enable a user to interact with computing system/server 1602; and/or any devices (e.g., network card, modem, etc.) that enable computing system/server 1602 to communicate with one or more other computing devices. Such communication can occur via I/O interfaces 1624. Still yet, computing system/server 1602 can communicate with one or more networks such as a local area network (LAN), a general wide area network (WAN), and/or a public network (e.g., the Internet) via network adapter 1626. As depicted, network adapter 1626 communicates with the other components of computing system/server 1602 via a bus. It should be understood that although not shown, other hardware and/or software components could be used in conjunction with computing system/server 1602. Examples, include, but are not limited to: microcode, device drivers, redundant processing units, external disk drive arrays, RAID systems, tape drives, and data archival storage systems, etc.

Although an exemplary embodiment of at least one of a system, method, and non-transitory computer readable medium has been illustrated in the accompanied drawings and described in the foregoing detailed description, it will be understood that the application is not limited to the embodiments disclosed, but is capable of numerous rearrangements, modifications, and substitutions as set forth and defined by the following claims. For example, the capabilities of the system of the various figures can be performed by one or more of the modules or components described herein or in a distributed architecture and may include a transmitter, receiver or pair of both. For example, all or part of the functionality performed by the individual modules, may be performed by one or more of these modules. Further, the functionality described herein may be performed at various times and in relation to various events, internal or external to the modules or components. Also, the information sent between various modules can be sent between the modules via at least one of: a data network, the Internet, a voice network, an Internet Protocol network, a wireless device, a wired device and/or via plurality of protocols. Also, the messages sent or received by any of the modules may be sent or received directly and/or via one or more of the other modules.

One skilled in the art will appreciate that a "system" could be embodied as a personal computer, a server, a console, a personal digital assistant (PDA), a cell phone, a tablet computing device, a smartphone or any other suitable computing device, or combination of devices. Presenting the above-described functions as being performed by a "system" is not intended to limit the scope of the present application in any way but is intended to provide one example of many embodiments. Indeed, methods, systems and apparatuses disclosed herein may be implemented in localized and distributed forms consistent with computing technology.

It should be noted that some of the system features described in this specification have been presented as modules, in order to more particularly emphasize their implementation independence. For example, a module may be implemented as a hardware circuit comprising custom very large-scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, graphics processing units, or the like.

A module may also be at least partially implemented in software for execution by various types of processors. An identified unit of executable code may, for instance, comprise one or more physical or logical blocks of computer instructions that may, for instance, be organized as an object, procedure, or function. Nevertheless, the executables of an identified module need not be physically located together but may comprise disparate instructions stored in different locations which, when joined logically together, comprise the module and achieve the stated purpose for the module. Further, modules may be stored on a computer-readable medium, which may be, for instance, a hard disk drive, flash device, random access memory (RAM), tape, or any other such medium used to store data.

Indeed, a module of executable code could be a single instruction, or many instructions, and may even be distributed over several different code segments, among different programs, and across several memory devices. Similarly, operational data may be identified and illustrated herein within modules and may be embodied in any suitable form and organized within any suitable type of data structure. The operational data may be collected as a single data set or may be distributed over different locations including over different storage devices, and may exist, at least partially, merely as electronic signals on a system or network.

It will be readily understood that the components of the application, as generally described and illustrated in the figures herein, may be arranged and designed in a wide variety of different configurations. Thus, the detailed description of the embodiments is not intended to limit the scope of the application as claimed but is merely representative of selected embodiments of the application.

One having ordinary skill in the art will readily understand that the above may be practiced with steps in a different order, and/or with hardware elements in configurations that are different than those which are disclosed. Therefore, although the application has been described based upon these preferred embodiments, it would be apparent to those of skill in the art that certain modifications, variations, and alternative constructions would be apparent.

While preferred embodiments of the present application have been described, it is to be understood that the embodiments described are illustrative only and the scope of the application is to be defined solely by the appended claims when considered with a full range of equivalents and modifications (e.g., protocols, hardware devices, software platforms etc.) thereto.

What is claimed is:

1. A system, comprising:
    a processor; and
    a memory storing instructions which when executed by the processor cause the processor to:
        receive a blockchain transaction proposal which includes input variables for a blockchain smart contract from a client application of an external computing system,
        execute the blockchain smart contract on the input variables to generate a transaction response in a functional programming language which includes a function that is to be invoked and executed by a blockchain peer to change a state of a blockchain, and variable bindings to be read by the function when the function is executed to create the change in the state of the blockchain,
        sign the function and the variable bindings,
        transmit the signed transaction response to the client application of the external computing system during an endorsement phase;
        receive a block including a blockchain transaction with the validation function and the variable bindings from an ordering service; and
        in response to receiving the block, reading the variable bindings and executing the function based on the variable bindings during a commit phase to generate the change to the state of the blockchain and writing the change to the state of the blockchain to a blockchain ledger.

2. The system of claim 1, wherein the function comprises a function body that encodes logic to be executed and an enclosing environment comprising the variable bindings.

3. The system of claim 1, wherein the function is generated by the blockchain smart contract, and the function is used at validation time to calculate an update to the state of the blockchain on the blockchain ledger.

4. The system of claim 3, wherein the function is determined by a chaincode function of the blockchain smart contract based on a current blockchain context.

5. The system of claim 1, wherein the processor is configured to sign the function with a cryptographic signature of an endorsing blockchain peer.

6. The system of claim 1, wherein the processor is further configured to create a write set that includes the change of the state of the blockchain, and commit the write set to a block of the blockchain ledger.

\* \* \* \* \*